(12) United States Patent
Brandwine

(10) Patent No.: US 12,086,250 B1
(45) Date of Patent: Sep. 10, 2024

(54) DETECTING ANOMALOUS I/O PATTERNS INDICATIVE OF RANSOMWARE ATTACKS

(71) Applicant: Amazon Technologies, Inc., Seattle, WA (US)

(72) Inventor: Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 17/548,261

(22) Filed: Dec. 10, 2021

(51) Int. Cl.
G06F 21/00 (2013.01)
G06F 13/20 (2006.01)
G06F 21/56 (2013.01)

(52) U.S. Cl.
CPC ............ G06F 21/566 (2013.01); G06F 13/20 (2013.01); *G06F 2213/40* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,013,395 | B1 | 3/2006 | Swiler et al. |
| 9,635,041 | B1 * | 4/2017 | Warman ............... G06F 21/55 |
| 10,079,842 | B1 | 9/2018 | Brandwine et al. |
| 10,341,355 | B1 | 7/2019 | Niemoller et al. |
| 10,469,525 | B2 * | 11/2019 | Hittel ................... G06F 21/552 |
| 10,609,066 | B1 | 3/2020 | Nossik et al. |
| 10,956,573 | B2 * | 3/2021 | Zheng .................. G06F 21/562 |
| 2015/0106338 | A1 | 4/2015 | Brandwine |
| 2015/0163231 | A1 * | 6/2015 | Sobko ................. H04L 63/1416 726/24 |
| 2017/0359388 | A1 | 12/2017 | Finchelstein et al. |
| 2018/0007069 | A1 | 1/2018 | Hunt et al. |
| 2018/0107824 | A1 | 4/2018 | Gibbons et al. |
| 2018/0212987 | A1 | 7/2018 | Tamir et al. |

(Continued)

OTHER PUBLICATIONS

Non-Final Office Action, U.S. Appl. No. 17/548,274, Feb. 1, 2024, 19 pages.

(Continued)

*Primary Examiner* — Maung T Lwin
(74) *Attorney, Agent, or Firm* — NICHOLSON DE VOS WEBSTER & ELLIOTT LLP

(57) ABSTRACT

Techniques are described for monitoring and analyzing input/output (I/O) messages for patterns indicative of ransomware attacks affecting computer systems of a cloud provider, and for performing various remediation actions to mitigate data loss once a potential ransomware attack is detected. The monitoring of I/O activity for such patterns is performed at least in part by I/O proxy devices coupled to computer systems of a cloud provider network, where an I/O proxy device is interposed in the I/O path between guest operating systems running on a computer system and storage devices to which I/O messages are destined. An I/O proxy device can analyze I/O messages for patterns indicative of potential ransomware attacks by monitoring for anomalous I/O patterns which may, e.g., be indicative of a malicious process attempting to encrypt or otherwise render in accessible a significant portion of one or more storage volumes as part of a ransomware attack.

20 Claims, 12 Drawing Sheets

(56) References Cited

U.S. PATENT DOCUMENTS

| | | |
|---|---|---|
| 2018/0359272 A1 | 12/2018 | Mizrachi et al. |
| 2018/0375892 A1 | 12/2018 | Ganor |
| 2019/0050299 A1 | 2/2019 | Rowe |
| 2019/0109870 A1 | 4/2019 | Bedhapudi et al. |
| 2019/0342330 A1 | 11/2019 | Wu et al. |
| 2020/0042707 A1 | 2/2020 | Kucherov et al. |
| 2020/0201827 A1* | 6/2020 | Chacko ................ G06F 9/4451 |
| 2020/0244672 A1 | 7/2020 | Grill et al. |
| 2021/0097181 A1* | 4/2021 | Reid ..................... G06F 21/565 |
| 2021/0203682 A1 | 7/2021 | Bajpai |
| 2021/0232685 A1* | 7/2021 | Kraemer ............... G06F 21/554 |
| 2021/0256117 A1* | 8/2021 | Aharoni ............... G06F 21/566 |
| 2022/0191238 A1 | 6/2022 | Mascarenhas et al. |
| 2022/0292196 A1* | 9/2022 | Bhagi ................... G06F 21/561 |
| 2022/0309171 A1 | 9/2022 | Du et al. |
| 2023/0334024 A1 | 10/2023 | Chacko |

OTHER PUBLICATIONS

Notice of Allowance, U.S. Appl. No. 17/548,285, Apr. 1, 2024, 21 pages.

* cited by examiner

OPERATIONS
800

DETECTING, BY A COMPUTER SYSTEM, A PATTERN OF INPUT/OUTPUT (I/O) MESSAGES INDICATIVE OF A POTENTIAL RANSOMWARE ATTACK, WHEREIN THE POTENTIAL RANSOMWARE ATTACK AFFECTS A STORAGE VOLUME ATTACHED TO A COMPUTE INSTANCE RUNNING ON THE COMPUTER SYSTEM, AND WHEREIN THE POTENTIAL RANSOMWARE ATTACK INVOLVES A MALICIOUS PROCESS RUNNING ON THE COMPUTE INSTANCE 802

IDENTIFYING A SNAPSHOT OF THE STORAGE VOLUME 804

CAUSING A COPY OF THE SNAPSHOT OF THE STORAGE VOLUME TO BE RETAINED IN STORAGE 806

*FIG. 8*

DETECTING ANOMALOUS I/O PATTERNS INDICATIVE OF RANSOMWARE ATTACKS

BACKGROUND

Malware continues to be a significant concern to the security of nearly all types of computing environments. One type of malware threat that has grown considerably in recent times is ransomware. Ransomware is a type of malware that affects a target computer system in some way (e.g., by encrypting the contents of the computer system, thereby rendering the computer system or portions thereof inaccessible) and demands a ransom to return the computer system back to its original state (e.g., by decrypting the contents). As is the case with many other types of malware, an attacker typically injects ransomware onto a computer system by tricking a user into downloading or opening a malicious file (e.g., a malicious email attachment, website download, or other type of Trojan horse file) or by exploiting a software vulnerability present on the system.

BRIEF DESCRIPTION OF DRAWINGS

Various embodiments in accordance with the present disclosure will be described with reference to the drawings, in which:

FIG. 8 is a flow diagram illustrating operations of a method for automatically providing access to volume snapshots responsive to the detection of a potential ransomware attack or other intentional malicious activity affecting a computer system in a cloud provider network according to some embodiments.

DETAILED DESCRIPTION

Figure 1:
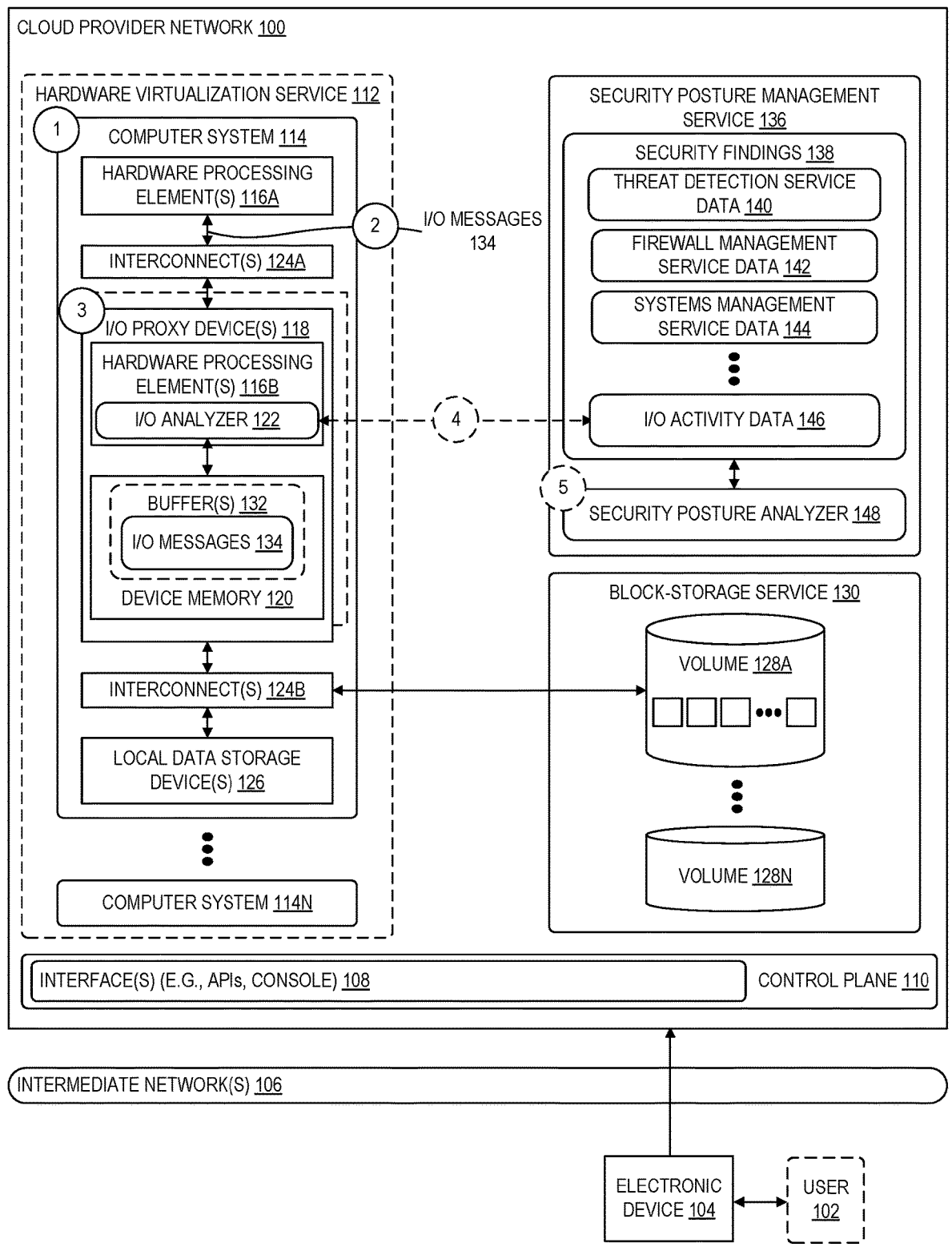
FIG. 1 is a diagram illustrating an environment for enabling the detection of ransomware attacks (or other types of intentional malicious activity) by monitoring and analyzing input/output (I/O) patterns using I/O proxy devices interconnecting the hardware processing elements of computer systems in a cloud provider network with data storage devices used by the computer systems according to some embodiments.

The present disclosure relates to methods, apparatus, systems, and non-transitory computer-readable storage media for monitoring and analyzing input/output (I/O) messages for patterns indicative of ransomware attacks or other intentional malicious activity affecting computer systems of a cloud provider, and for performing various remediation actions to mitigate data loss once such malicious activity is detected. According to some embodiments, the monitoring of I/O activity for such patterns is performed at least in part by I/O proxy devices coupled to computer systems of a cloud provider network, where an I/O proxy device is interposed in the I/O path between guest operating systems running on a computer system and storage devices to which I/O messages are destined. An I/O proxy device can analyze I/O messages for patterns indicative of potential ransomware attacks by monitoring for anomalous I/O patterns which may, e.g., be indicative of a malicious process attempting to encrypt or otherwise render in accessible a significant portion of one or more storage volumes as part of a ransomware attack, attempting to corrupt the data stored on a storage volume, or the like.

Once an I/O proxy device or other component of a computer system detects an I/O pattern indicative of a potential malware attack or other intentional malicious activity, in some embodiments, the computer system can send data indicating detection of the potential malicious activity to a security posture management service or other component of a cloud provider network. A security posture management service, for example, can correlate the data received from the computer system with security findings obtained from other sources (e.g., firewall management service data indicating anomalous network activity involving the computer system, threat detection service data indicating the presence of a malicious process running on the computer system, systems management service data indicating potentially malicious actions performed by the computer system, etc.).

As described in more detail herein, once a potential ransomware attack or other intentional malicious activity is identified by an I/O proxy device, a security posture management service, or both, various components of a cloud provider can perform remediation actions to mitigate data loss as a result of the attack. For example, according to various embodiments, user alerts can be generated to notify a user of the potential attack, firewall settings can be automatically updated to prevent spread of the attack, automated snapshots of an affected storage volume can be generated or otherwise caused to be retained in storage, and the like. Among other benefits, the ability to detect ransomware and other malicious activity in near real-time and to automatically perform various remediation actions improves the security and data availability of computer systems provided to users of a cloud provider.

Ransomware and other types of malicious activity pose an ongoing threat to almost any networked computing environment. A typical ransomware attack, for example, involves an attacker gaining access to a user's computer system, encrypting files on the computer system or otherwise rendering portions of the system unusable to the user, and demanding a ransom from the user in exchange for decrypting the files on the user's system. At a high level, the detection of such ransomware attacks can thus generally involve analyzing at least two signals. One signal can be derived from detecting various methods by which an attacker may gain access to a user's system in order to install a malicious process used to carry out a ransomware attack. Many cloud providers and other security services provide tools aimed at detecting network-based attacks, the presence of malware on users' computing systems, and other security findings indicative of an attacker gaining unauthorized access to users' computer systems.

A second signal for detecting ransomware or other types of malicious attacks can be derived from actions performed by a malicious process to render a user's data inaccessible. However, analyzing a computer system for such activity presents a number of challenges. For example, a computer system infected with ransomware is inherently compromised and any malicious process carrying out a ransomware attack may typically attempt to conceal its presence or otherwise evade detection. At some point in time, a malicious process carrying out the ransomware attack typically begins encrypting significant portions of a user's storage volume-however, the ability to monitor such I/O activity is not easily accessible. Furthermore, the detection of ransomware and other security-related attacks is typically based on imperfect statistical analyses, and accurately determining the presence of ransomware is challenging based on the analysis of any one particular signal.

To address these challenges, among others, techniques are described herein for detecting ransomware attacks and other intentional malicious activity by analyzing I/O patterns using I/O proxy devices interconnecting the hardware processing elements of computer systems in a cloud provider with data storage devices used by the computer systems (including, e.g., both local data storage devices and network-accessible data storage devices). The analysis of I/O patterns using a separate I/O proxy device enables computer systems to detect potential malicious attacks in an operating system-agnostic manner and without concern of the I/O proxy device itself being compromised. According to embodiments, the computer systems can also send data reflecting the detection of potential ransomware attacks and other malicious activity to a security posture management service of a cloud provider, where the security posture management service can aggregate and correlate the data with security findings obtained from other services and tools (e.g., flow logs, DNS streams, etc.) to better identify whether a ransomware attack is occurring.

FIG. 1 is a diagram illustrating an environment for enabling the detection of potential ransomware attacks or other intentional malicious computer system activity by analyzing I/O patterns using I/O proxy devices interconnecting the hardware processing elements of computer systems in a cloud provider with data storage devices used by the computer systems according to some embodiments. A provider network 100 (or "cloud" provider network) provides users with the ability to use one or more of a variety of types of computing-related resources such as compute resources (e.g., executing virtual machine (VM) instances and/or containers, executing batchjobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users (e.g., user 102) can interact with a provider network 100 using an electronic device 104 and across one or more intermediate networks 106 (e.g., the internet) via one or more interface(s) 108, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane 110 of the provider network 100 that includes "backend" services supporting and enabling the services that can be more directly offered to customers.

For example, a cloud provider network (or just "cloud" provider" or "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

The hardware virtualization service 112 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server (such as, e.g., computer system 114A, . . . , computer system 114N) to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management, input/output virtualization to network-attached storage volumes (e.g., as performed by the I/O proxy device 116, as described in more detail herein), local migration management tasks, instance health monitoring, and the like). Virtual machines are commonly referred to as compute instances or simply "instances". As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, a provider network 100 includes a container service. A container service, for example, can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As indicated above, in some embodiments, a computer system 114 can include one or more hardware processing elements 116A (e.g., one or more central processing units (CPUs), graphics processing units (GPUs), etc.), one or more data storage devices (e.g., hard disk drives (HDDs), solid-state drives (SSDs), network-accessible block storage devices, and so forth), and an I/O proxy device 118 that is interposed between at least one of the hardware processing elements 116A and at least one of the one or more data storage devices. As shown in FIG. 1, for example, a computer system 114 includes one or more hardware processing elements 116A, system memory (not shown), interconnect(s) 124A and 124B, at least one I/O proxy device 118 (which itself includes one or more hardware processing elements 116B), and one or more local data storage device(s) 126, network-accessible data storage device(s) (e.g., providing one or more storage volumes 128A, ..., 128N), or both. In general, the interposition of an I/O proxy device 118 between a computer system's hardware processing elements and data storage devices enables the I/O proxy device 118 to participate in a computer system's I/O data path, e.g., by receiving I/O messages generated by system components—for example, read and write requests—and performing various actions relative to such messages. According to embodiments described herein, the I/O proxy device 118 can, e.g., analyze series of I/O messages for patterns that indicate potential ransomware attacks.

As shown in FIG. 1, an I/O proxy device 118 includes its own hardware processing elements 116B, device memory 120, and possibly other components that are independent from other components of a computer system of which it is a part (e.g., a computer system 114). These components of the I/O proxy device 118 enable the device to execute software providing, among other functionality, I/O message analysis to detect potential occurrences of ransomware. In some embodiments, the I/O analyzer 122 is an application running on the hardware processing element(s) 116B of the I/O proxy device 118 and that is used to monitor and analyze I/O messages as described herein.

In general, I/O is an integral aspect of virtually any computer system and most computer systems interface with one or more data storage devices during operation. A computer system that is used to execute software implementing, e.g., a web server, database server, or user application frequently encounters operations that involve writing or reading data from one or more data storage devices coupled to the computer system. For example, I/O operations may be used to retrieve files representing web pages to be served by a web server, to store records in a database, to store or retrieve log data, among many other possible reasons for accessing a data storage device. These types of software applications and others often include logic intended to prevent various types of undesirable activity involving data stored on data storage devices. However, virtually all software applications and computer systems are nevertheless susceptible to various types of misuse and other security issues. If a computer system is infected with ransomware, for example, software running on the system may attempt to modify data stored at a data storage device in undesirable ways. Within such computer systems, the software itself is often the last line of defense for mitigating these types of issues and any resulting I/O requests issued by an operating system (OS) are generally passed to I/O devices by the underlying hardware with impunity. Thus, the ability to use an I/O proxy device 118 as described herein to perform various types of I/O monitoring and analysis, independent of other hardware and software involved in the I/O data communications paths of a computer system, can help detect and mitigate some of the undesirable behavior and vulnerabilities associated with ransomware attacks.

In an embodiment, each of hardware processing element 116A and hardware processing element 116B is generally any type of processor capable of executing instructions. For example, a hardware processing element can be a general-purpose or embedded processor implementing any of a variety of instruction set architectures (ISAs), such as the x86, ARM, PowerPC, SPARC, or MIPS ISAs, or any other suitable ISA. In multiprocessor systems, each of hardware processing elements may commonly, but not necessarily, implement the same ISA. In embodiments with multiple hardware processing elements, each processing element can have a dedicated bank of system memory or share system memory with other hardware processing elements. In some embodiments, a hardware processing element accesses system memory via a memory bus (not shown) or via an interconnect 124A. A hardware processing element can include one or more processor cores, each having one or more levels of dedicated or shared cache (for example, L1 cache, L2 cache, and so forth).

In an embodiment, system memory stores program instructions and other data accessible by hardware processing elements. Program instructions and data correspond to one or more desired functions, depending on the various service(s) being performed by computer system 114. In other embodiments, program instructions and/or data may be received, sent, or stored on different types of computer-accessible media. In various embodiments, system memory may be implemented using any suitable computer-accessible storage medium. Generally speaking, a computer-accessible storage medium may include non-transitory storage media or memory media such as magnetic or optical media, for example, disk or DVD/CD coupled to computer system 114 via an interconnect 124B. A non-transitory computer-accessible storage medium may also include any volatile or non-volatile media such as random-access memory (RAM) (for example, SDRAM, static RAM, dynamic RAM (DRAM), double data rate (DDR) SDRAM, and the like), read only memory (ROM), or other non-volatile memory (for example, Flash). Computer-accessible media may include transmission media or signals such as electrical, electromagnetic, or digital signals, conveyed via a communication medium such as a network and/or a wireless link, such as may be implemented via a network interface. In such cases, a computer system 114 may access program instructions and data from a remote computer-accessible storage medium via the computer-accessible media.

In some embodiments, a computer system 114 includes one or more network interface(s) (not shown) that allow data to be exchanged between the computer system 114 and other electronic devices attached to a network or networks, such as other computer systems or hardware within a cloud provider network 100 of which the computer system 114 is a part. In some embodiments, an I/O proxy device 118 includes its own network interface(s) that may be separate from other network interfaces of the computer system 114. In some embodiments, a network interface of the computer system 114 or a network interface of the I/O proxy device 118 supports communication via any suitable wired or wireless data network, such as Ethernet (for example, 802.3), 802.11, IP-based networks, Fiber Channel, Infiniband, and the like. These network interfaces may support communication via telecommunications/telephony networks such as analog voice networks or digital fiber communications networks any other suitable type of network and/or protocol.

Interconnect(s) 124A and 124B coordinate I/O traffic between components of computer system 114, such as between hardware processing element(s) 116A, memory, network interface(s), the I/O proxy device 118, and any other components that may be coupled to interconnect(s) 124A and 124B. Interconnect(s) 124A and 124B generally facilitate communication by a protocol that controls the timing, sequence, form, and content of data being exchanged among components. Example interconnects and protocols include QuickPath Interconnect (QPI), Peripheral Component Interconnect (PCI), Universal Serial Bus (USB), Small Computer System Interface (SCSI), Serial Attached SCSI (SAS), AT Attachment (ATA), Ethernet, variants or progeny of each, and the like. Multiple interconnects 124A and 124B may couple components of computer system 114. For example, some components may be connected with an I2C bus, others with a PCI bus, and others with both the PCI bus and the I2C bus. In some embodiments, bridges relay communications between different types of interconnects (e.g., from one device on a first interconnect, through a bridge, to another device on a second interconnect).

In some embodiments, either or both of the hardware processing element(s) 116A and 116B of a computer system 114 can include one or more special purpose (SP) processors. In embodiments with multiple SP processors, each SP processor may have a dedicated bank of memory or may share memory with other SP processor(s). Each SP processor might be an accelerator, coprocessor, field-programmable gate array (FPGA), application-specific integrated circuit (ASIC), or other processing device that can perform specialized operations (for example, graphics rendering, encryption and decryption, and so forth). In some embodiments, computer system 114 includes more than one type of SP processor.

In some embodiments, computer system 114 includes one or more local data storage devices 126. In some embodiments, local data storage devices 126 provide block storage via one or more logical volumes to software executing on the computer system 114, including to one or more customer compute instances that may be virtualized on computer system 114. Hardware processing elements 116A and 116B and/or other devices (for example, direct memory access (DMA) controllers, and so forth) can access local storage volume(s) to store and retrieve code and/or data. Local data storage devices 126 generally include non-transitory computer-readable media, such as magnetic disks, optical disks, flash memory devices, phase-change memory devices, RAM, ROM, and the like.

In some embodiments, a computer system 114 can additionally or alternatively access one or more remote and network-accessible data storage devices via one or more network(s). These remote, network-accessible data storage devices similarly can provide block storage via logical volumes (e.g., volume 128A, volume 128N) to software executing on the computer system 114, including to customer compute instances running on the computer system. In some embodiments, the use of network-accessible data storage devices is provided by a block-storage service 130 or other type of storage service of a cloud provider network 100. In some embodiments, computer system 114 includes one or more other I/O devices that can store, process, and/or communicate code and/or data for computer system 114.

As indicated, a computer system 114 can include one or more I/O proxy devices 118. In some embodiments, each of the I/O proxy devices 118 is at a component interface to a computer system 114. For example, in FIG. 1, an I/O proxy device 118 resides between hardware processing elements 116A and one or more data storage devices (e.g., local data storage devices 126, network-accessible data storage device(s) provided by the block-storage service 130, or both). Although not shown, an I/O proxy device 118 can be included between any other I/O devices (if any) and the hardware processing elements 116A. In addition to interfacing to interconnects 124A and 124B, an I/O proxy device 116 can include one or more network interfaces.

In some embodiments, the I/O proxy device 118 (including hardware processing elements 116B, I/O device memory 120, and network interface(s)) is part of an "offload card" (e.g., a PCI Express-based card) that is connected to the motherboard of the computer system 114. For example, a computer system 114 can include one offload card that is connected to a control plane of the cloud provider network 100 (via a network interface of the offload card) of which the computer system 114 is a part, and also include another offload card that is connected to a data plane network of the cloud provider network and that can be configured to perform the I/O message analysis operations described herein. In this example, the offload card connected to the control plane can optionally receive ransomware or other malicious activity analysis requests (e.g., requests to enable ransomware analysis, to modify remediation options, and so forth, from other components of the cloud provider network 100) and can configure the other offload card to implement the relevant analysis features (e.g., using a direct connection between the offload cards or other interfaces of the computer system). In other embodiments, both the control plane and I/O analysis functionality can be implemented and performed using a single offload card.

In some embodiments, an I/O proxy device 118 executes software used to enable virtualization of the computer system 114 (e.g., by executing customer compute instances) by offloading operations that would otherwise be performed by the other processor(s) in computer system 114 (for example, by hardware processing element(s) 116A). An example operation is coordinating shared resources amongst virtualization instances, such as in situations where multiple customer compute instances compete for access to a single device, such as a network interface. Another example operation is device emulation to enable software executing on a hardware processing element 116A to interact with one or more local data storage device(s) 126 or network-accessible data storage device(s). In addition to offloading virtualization management from other processors in computer system 114 to the I/O proxy device 118, an I/O proxy device 118 can provide inter- and intra-system security to isolate compute instances that may be allocated to different customers and executing on different processors within computer system 114 and to isolate those instances from the remainder of a cloud provider network of which the computer system 114 may be apart. In an embodiment, the multi-tenant operation of the computer system 114 enables two or more different customers of a cloud provider network to concurrently run compute instances on the system. In systems executing multiple compute instances associated with one or more customers of a service provider network, I/O analysis operations can be configured to apply to individual compute instances or to selected compute instances associated with one or more particular customers or configured to apply to all customer instances running on a computer system.

In some embodiments, an I/O proxy device 118 includes functionality used to manage compute instances executing on computer system 114. Such management can include pausing and un-pausing compute instances, launching and terminating compute instances, performing memory transfer and copying operations, and so forth. In some embodiments, these operations are performed by a hypervisor that works with the I/O proxy device 118 and that is executed by one or more other hardware processing elements 116A of the computer system 114 (for example, the hypervisor can direct the I/O proxy device 118 to create or destroy virtual devices for virtual machines on the server). In other embodiments, no hypervisor executes on the other hardware processing elements 116A of the computer system 114. In such embodiments, the hypervisor executed by the I/O proxy device 118 can accommodate requests from the other processors.

In some embodiments, program instructions and any other data for the hardware processing elements 116B of the I/O proxy device 118 are stored on I/O proxy device memory 120 accessible by hardware processing element(s) 116B, similar to how system memory stores program instructions and data accessible by hardware processing element(s) 116A, as described above. In some embodiments, the I/O proxy device memory 120 includes storage of program instructions implementing an I/O analyzer 122 program, and one or more I/O buffers 132 that are used to store I/O messages 134 received by the I/O proxy device 118 and upon which I/O analyzer 122 can perform analyses, as described elsewhere herein.

Typically, the I/O messages used by computer system 114 software to interface with block devices, such as a local data storage device 126 or network-accessible data storage device, are packetized, with each I/O message packet possibly containing only a portion of the data requested (for example, if the requested data is larger than a block). For example, an operation of reading a file from a local data storage device 126 may involve a hardware processing element 116A sending many requests to read data from specified sectors or blocks of the data storage device, where common block sizes are 512 bytes, 1 kilobyte, or 4 kilobytes. In some embodiments, when a block of data is stored in memory (e.g., after a read or pending a write), it is stored in a buffer containing only the single block of data. In the example of FIG. 1, where I/O messages pass through an I/O proxy device 118, the blocks can be stored in buffers 132 of the I/O proxy device memory 120. Here, a buffer 132 storing an I/O message serves as the object that represents a disk block in memory for the I/O proxy device 118. Because a program operating on the I/O messages may expect some associated control information to accompany the I/O data (such as an indication of a block device associated with the request, and which specific block the buffer represents), each buffer can be associated with a descriptor that identifies such information about the block.

In some embodiments, an I/O proxy device 118 can operate on I/O messages using "cut-through" processing techniques that do not rely on fully assembling and storing the I/O messages in a buffer 132. For example, the I/O proxy device 118 can instead process the I/O messages in a streaming fashion, where the device can begin operating on the messages as soon as a sufficient portion of the message is received (e.g., as soon as an I/O message header is received indicating a message type and a destination of the message).

In some embodiments, a computer system 114 further includes a power supply and cooling subsystems (not shown). One or more of the processors described above can access a basic input output system (BIOS) or other low-level software program to obtain voltage level(s) output by the power supply, current levels sourced from the power supply, cooling fan speeds, temperature readings, and other environmental conditions.

As indicated above, a computer system 114 may at any point in time be executing one or more applications (e.g., user applications) hosted by one or more guest operating systems, where these guest operating system(s) and application(s) execute on the hardware processing elements 116A. The guest operating system(s) have access to some hardware components (e.g., via software driver(s)) and access to other hardware components via software executing on the I/O proxy devices 118. Access to I/O devices via an I/O proxy device 118 is generally transparent to the guest operating system(s) and user applications. For example, a guest operating system executing on a hardware processing element 116A can initiate an I/O request message to a local data storage device 126 as if it were in direct communication with the local data storage device via an interconnect 124B, even through traffic between the hardware processing element 116A and local data storage device 126 is routed through the I/O proxy device 118.

The numbered circles in FIG. 1 illustrate a process involving a computer system 114 of a cloud provider network 100 that has become infected by a malicious process attempting to carry out a ransomware attack or other intentional malicious activity, an I/O proxy device 118 analyzing I/O messages 134 generated by one or more guest operating systems running on the computer system 114, the computer system 114 sending data indicating detection of a potential attack to a security posture management service 136, the security posture management service 136 correlating the data with other security findings 138 to determine a likelihood that a malicious attack is occurring, and the security posture management service 136 or other components causing one or more remediation actions to occur.

At circle "1," for example, the computer system 114 becomes infected by ransomware or some other type of malicious process at some point in time. For example, the computer system might become infected with malware based on the introduction of a malicious executable process via a phishing email, software exploit, the system visiting an infected website, a network-based attack, based on the computer system already being a part of a botnet, or the like. Once infected by a malicious process, the process can execute further actions at any point in time to carry out one or more types of attacks (e.g., to encrypt some or all of the files accessible to the computer system 114, attempt to corrupt data accessible to the computer system 114, attempt to infect other computer systems in a same network, etc.).

At circle "2," a guest operating system running on the computer system 114 generates I/O messages 134 based at least in part on operations performed by a malicious process running on the computer system 114 and carrying out part of an intentional malicious attack. For example, a compute instance (e.g., a VM instance, container, etc.) running on the computer system 114 causes the hardware processing element 116A to generate I/O request messages 134, where the I/O messages are directed to a data storage device (e.g., a local storage device 126 or network-accessible volume 128A in the example of FIG. 1).

As indicated, in the example of FIG. 1, the I/O request messages 134 include I/O operations performed by a malicious process that is executing upon the hardware processing element(s) 116A (e.g., reading data stored on a volume provided by a data storage device, modifying the data by encrypting the contents, and writing the data back to the data storage volume, etc.). These I/O requests generally are first received by a guest O/S hosting the malicious process, a hypervisor, or both, where the guest O/S or hypervisor further causes a hardware processing element 116A to generate one or more I/O request messages 134 to perform the requested operations. As indicated herein, each I/O request message 134 can be packetized and include information identifying a storage location to which the request relates (e.g., a physical page, a location of a block as an offset into the page, a length of the block from a given offset, a file identifier, etc.), a type of operation (e.g., a read, a modify, or a write operation), data associated with the request (e.g., a block of data or file to be written to the data storage device), among other possible information.

At circle "3," the I/O proxy device 118 optionally stores the I/O messages 134 in one or more buffers 132 and executes an I/O analyzer 122 program to analyze the I/O messages, e.g., for patterns indicative of a ransomware attack or other intentional malicious activity. For example, the I/O proxy device 118 receives the request messages 134 via interconnect(s) 124A due to its interposition between the hardware processing element(s) 116A and one or more data storage devices, as described herein. In the example of an I/O request message 134 corresponding to a read operation, in some embodiments, a buffer 132 stores the message including an indication of a storage location from which data is requested or, in the example of a write operation, a buffer 132 stores the request message and a block of data to be written to a data storage device and an indication of a location at which the data is to be written. In other examples, the I/O messages are processed in a streaming fashion and without storing an entire I/O message in a buffer.

In some embodiments, as I/O messages 134 pass through the I/O proxy device 118, an I/O analyzer 122 executing on the I/O proxy device 118 analyzes the I/O messages for anomalous patterns of I/O activity. For example, a malicious process carrying out a ransomware attack typically begins encrypting the files on a disk, or the entire disk itself at the block level, in rapid succession. The I/O pattern thus involves a succession of read-modify-write type operations (e.g., to read a block or other portion of a data volume, modify the block or portion of data based on the malicious process encrypting the data, and write the modified block or other data back to storage volume). The I/O analyzer 122 can thus keep track of state indicating a number of such operations being requested within a period of time, information indicating whether the operations relate to successive blocks or files stored on a storage device (e.g., based on the metadata associated with the I/O messages), and the like. In the case of other types of malicious processes, other patterns can be present and detected such as a persistent series of write operations (e.g., in the case of a malicious process simply corrupting the data stored in a volume) or a persistent series of read operations (e.g., in the case of a malicious process exfiltrating large amounts of data).

Figure 2:
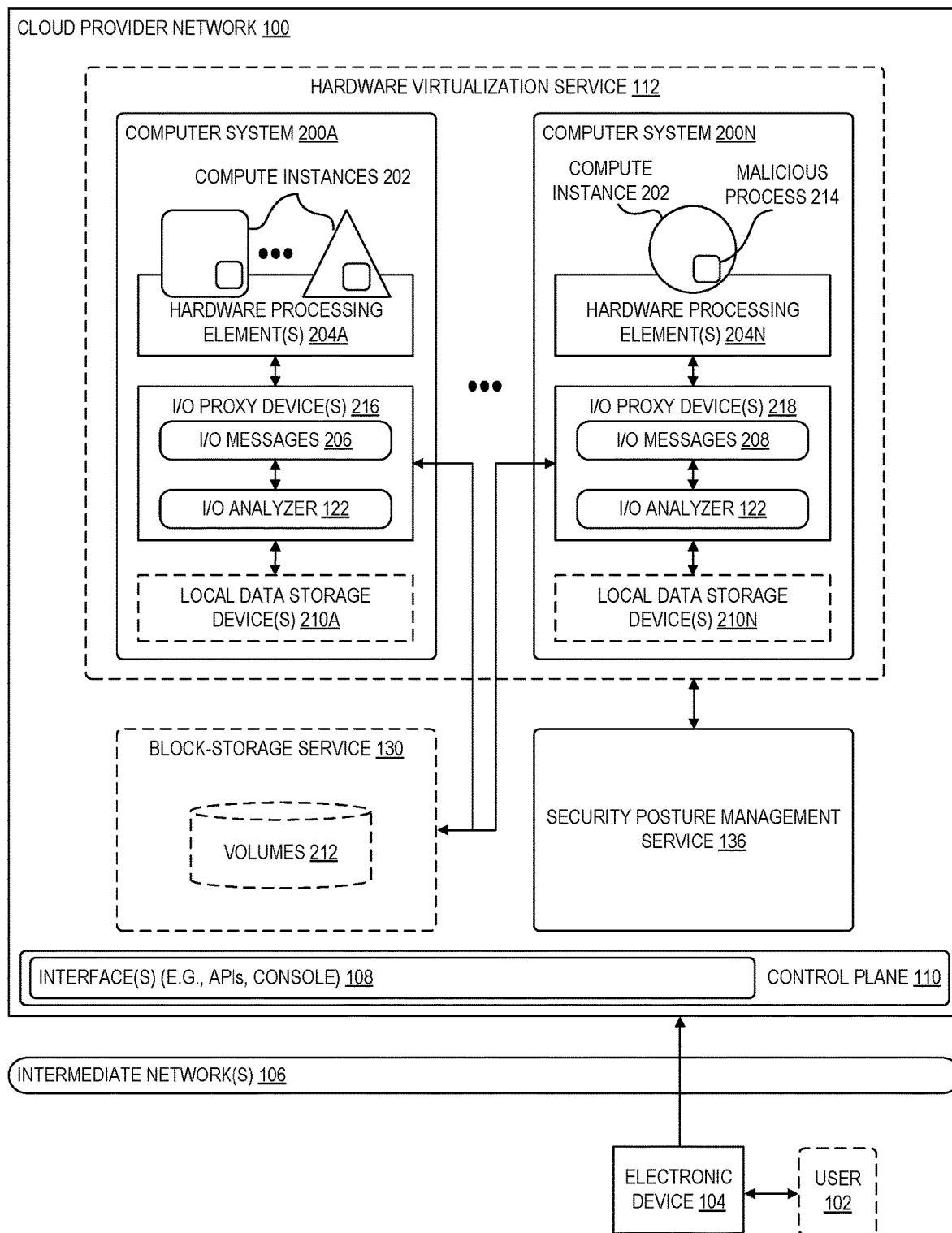
FIG. 2 is a diagram illustrating the use of I/O proxy devices to detect anomalous patterns of I/O activity originating from various different types of guest operating systems running on computer systems of a cloud provider network according to some embodiments.

In some embodiments, the ability to monitor I/O activity as described above for anomalous patterns is largely independent of a type of guest operating system or malicious process running on the computer system. For example, because the I/O messages 134 received by the I/O proxy device 118 from hardware processing element(s) 116A are largely the same for different types of guest operating systems, a same I/O analyzer 122 can be used to monitor I/O patterns from disparate source compute instances. FIG. 2 is a diagram illustrating the use of I/O proxy devices to detect anomalous patterns of I/O activity originating from various different types of guest operating systems running on the computer systems of a cloud provider according to some embodiments.

As shown in FIG. 2, computer systems 200A, . . . , 200N host one or more types of operating systems. For example, the computer system 200A includes at least two different types of compute instances 202 (e.g., different operating systems types or versions running on a same hypervisor) executing on hardware processing element(s) 204A, while the computer system 200N includes yet another type of guest compute instance 204 executing on hardware processing element(s) 204N. Each of the computer systems 200A, . . . , 200N includes an I/O proxy device (e.g., I/O proxy device 216 or 218) executing an I/O analyzer 122, where the I/O analyzer 122 at computer system 200A monitors I/O messages 206 while the I/O analyzer 122 at computer system 200N monitors I/O messages 208. Each of the computer systems optionally includes respective local data storage device(s) 210A, . . . , 210N, and further can use remote storage volumes 212 provided by the block-storage service 130. As further illustrated, the compute instance 202 running on the computer system 200N has become infected by a malicious process 214, which may be in the process of carrying out a ransomware attack. As indicated, the I/O analyzer 122 can monitor I/O messages 208 generated by the malicious process 214 independent of a type of compute instance 202 upon which the malicious process 214 is executing due to its placement in the I/O path of the computer systems, thereby enabling efficient ransomware detection across a range of computing environments.

In some embodiments, the I/O proxy device is coupled to a control plane of the provider network 100 and thus the ability to monitor I/O messages for potential ransomware attacks can be selectively enabled or disabled or the analysis process can be configured. For example, a user associated with a computer system can provide input indicating whether the user desires for the I/O analyzer 122 to monitor I/O messages for patterns indicative or ransomware (and for potentially other types of malware or other operational issues), whether continuous or periodic monitoring is desired, one or more particular types of I/O patterns for which to monitor, and the like. Responsive to such input, a control plane of the provider network 100 can send request to the I/O proxy device 216 instructing the I/O proxy device to configure itself and the I/O analyzer 122 accordingly, thereby enabling the dynamic configuration of the types of I/O monitoring described herein.

Returning to FIG. 1, at circle "4," the I/O analyzer 122 program optionally sends data to a security posture management service 136 indicating the identification by the I/O analyzer 122 of a potential ransomware attack or other intentional malicious activity. For example, upon the I/O analyzer 122 detecting a pattern of I/O messages indicative of a potential ransomware attack (e.g., a pattern of read-modify-write type operations affecting a series of storage volume blocks or files stored on a storage volume), the I/O analyzer 122 can send data to a security posture management service 136 reflecting the detection of a potential ransomware attack. In some embodiments, the data can include I/O activity data 146 including logs of the I/O messages that triggered the I/O analyzer, data reflecting a summary of the I/O activity, etc. As described herein, the ability to send logs or other I/O activity data 146 can enable analysis of the data using more resources than are available locally on the I/O proxy device 118 and can further enable the data to be correlated with other security findings 138 for better detection accuracy.

At circle "5," a security posture analyzer 148 analyzes the I/O activity data 146 optionally in combination with other security findings 138 related to the computer system 114. For example, a security posture management service 136 can be configured to collect security findings 138 from a number of sources including, e.g., threat detection service data 140, firewall management service data 142, systems management service data 144, and the like. These data sources can include network flow logs, Domain Name System (DNS) logs, account activity log, and other information reflecting activity caused by or involving a computer system 114. The security posture analyzer 148 can then determine a likelihood of whether the I/O activity actually reflects a ransomware attack or other type of intentional malicious activity, e.g., based on other security findings 138 indicating that a malicious process was detected, that anomalous network activity was detected, etc. In some embodiments, user feedback can be provided indicating whether a detected potential attack was actually a malicious attack, where such feedback can be used as feedback into the statistical analyses performed by the security posture analyzer 148 to enable more accurate detection.

Figure 3:
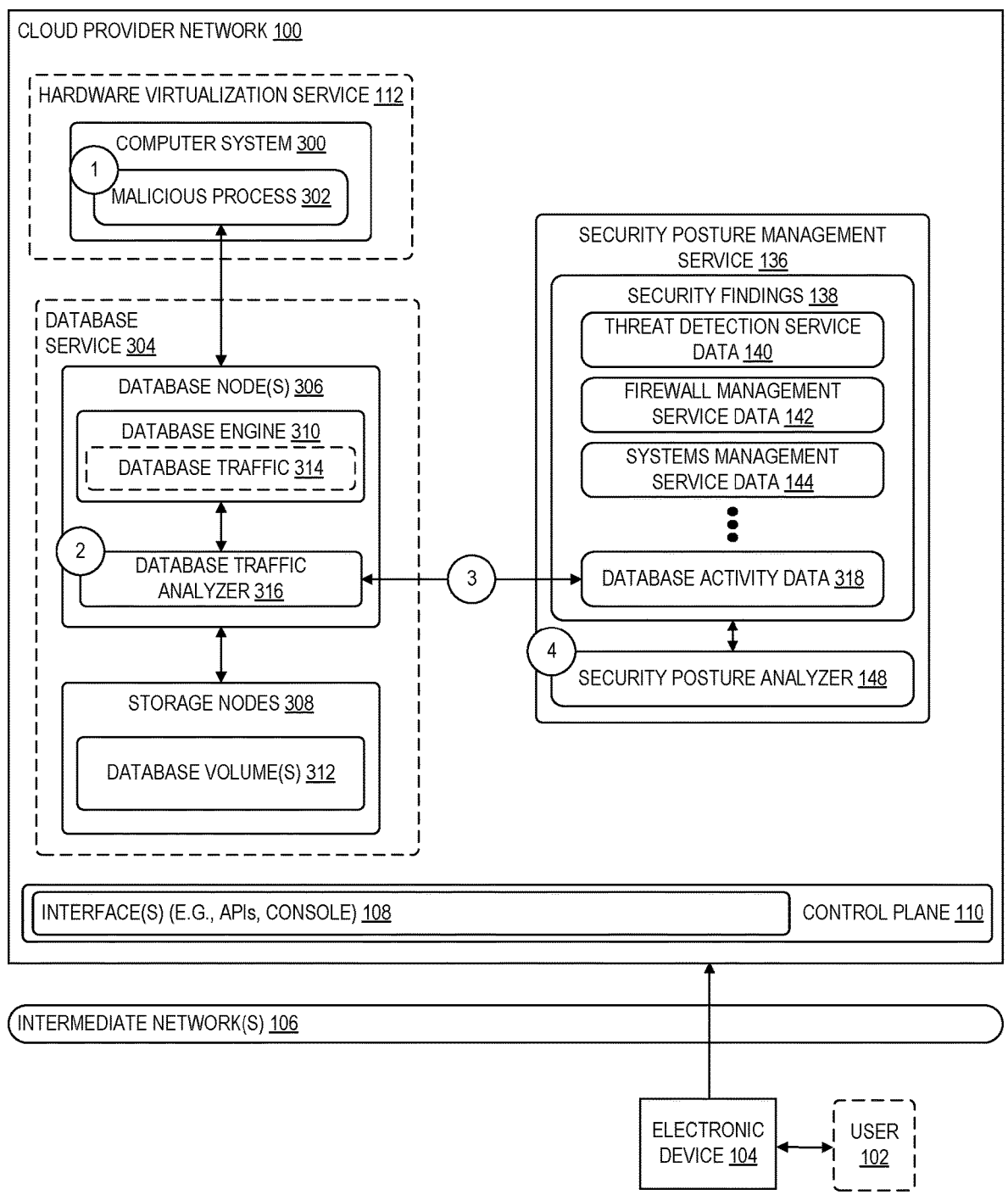
FIG. 3 is a diagram illustrating an environment for enabling the detection of ransomware attacks or other types of intentional malicious activity affecting a database by analyzing I/O patterns using database nodes of a database service provided by a cloud provider according to some embodiments.

The examples described in connection with FIG. 1 illustrate the detection of ransomware and other intentional malicious activity affecting one or more storage volumes. There also exists ransomware and other types of malware that targets or can otherwise affect data stored in databases. FIG. 3 is a diagram illustrating an environment for enabling the detection of ransomware attacks and other types of malicious activity affecting a database by analyzing I/O patterns using database nodes of a database service provided by a cloud provider according to some embodiments. At circle "1" in FIG. 3, a computer system 300 has become infected with a malicious process 302 that is part of a ransomware attack or other malicious process that affects data stored in one or more databases. In this example, the computer system 300 hosts one or more compute instances, at least one of which has been infected by the malicious process 302.

The database service 304 generally enables users to create, manage, and use relational databases in a cloud-based environment and in a manner that provides enhanced security, availability, and reliability relative to other database environments. For example, in some embodiments, the database service 304 features a distributed, fault-tolerant, and self-healing storage system that automatically scales (e.g., implemented in part using a scalable storage service). A database system provided by the database service 304 organizes the basic operations of a database (e.g., query processing, transaction management, caching, and storage) into tiers that can be individually and independently scalable. For example, in some embodiments, each database instance provided by the database service 304 includes a database tier (which may include one or more database nodes 306, sometimes also referred to as "head nodes"), a separate and distributed storage system (which may include multiple storage nodes 308 that collectively perform some of the operations traditionally performed in the database tier of existing database systems), and a backup storage tier.

In general, a database is a set of data, collection of records, or other grouping of data objects stored in a data store. In some embodiments, a data store includes one or more directly or network-attached storage devices accessible to a database engine 310 (e.g., block-based storage devices like hard disk drives or solid-state drives). As indicated above, in some embodiments, the data store is managed by a separate storage service. In some embodiments, management of the data store at a separate storage service includes distributing the data amongst multiple different storage nodes (e.g., storage nodes 308) to provide redundancy and availability for the data.

In some embodiments, the data for a database is stored as database volume(s) 312 and in one or more portions of the data store, such as data pages. One or multiple data values, records, or objects may be stored in a data page. In some embodiments, data pages further include metadata or other information for providing access to the database. For example, data pages can store data dictionaries, transaction logs, undo and redo log records, and so forth. A query engine of a database engine 310 performs access requests (e.g., requests to read, obtain, query, write, update, modify, or otherwise access) based on state information. The state information can include, for example, data dictionaries, undo logs, transaction logs/tables, indexing structures, mapping information, data page caches or buffers, and the like, or any other information used to perform access requests with respect to the database. For example, state information may include mapping information (e.g., an index) used to obtain data records that match certain search criteria (e.g., query predicates).

In some embodiments, the database systems described herein support a standard or custom API for a variety of database operations. For example, the API may support operations for creating a database, creating a table, altering a table, creating a user, dropping a user, inserting one or more rows in a table, copying values, selecting data from within a table (e.g., querying a table) canceling or aborting a query, creating a snapshot, performing an online restore or "backtrack" operation, among other possible operations.

As shown in FIG. 3, a database engine 310 is interposed in the database traffic 314 path of requests sent from a computer system 300 and the storage nodes 308 storing the database volume(s) 312, thereby providing an opportunity to monitor and analyze database traffic 314 for patterns indicative of a ransomware attack or other type of malicious activity affecting data stored in a database. For example, similar to the analysis performed by an I/O proxy device 118 in FIG. 1, at circle "2" in FIG. 3, a database traffic analyzer 316 can monitor and analyze database traffic 314 for patterns of traffic indicating that a process is reading records from a database, modifying the database records, and storing the database records back to the database (e.g., as part of a malicious process encrypting the contents of the database). For other types of malicious attacks, other types of patterns can be detected such as series of database operations modifying sequential database records, or the like.

At circle "3," responsive to the database traffic analyzer 316 detecting a database traffic pattern indicative of a potential ransomware attack or other malicious activity, the analyzer sends data (e.g., database activity data 318) to a security posture management service 136 indicating that the pattern has been detected. Similar to FIG. 1, at circle "4" in FIG. 3, a security posture analyzer 148 can analyze the database activity data 318, possibly in combination with other security findings 138 relevant to the computer system 300, to determine a likelihood that the detected database traffic pattern corresponds to an actual attack. Once a determination of the likelihood of the malicious attack is made, the security posture management service 136 or other components of the cloud provider network 100 can perform various remediation actions such as generating a snapshot of a database volume, throttling or blocking database traffic, etc., as described in more detail hereinafter.

Figure 4:
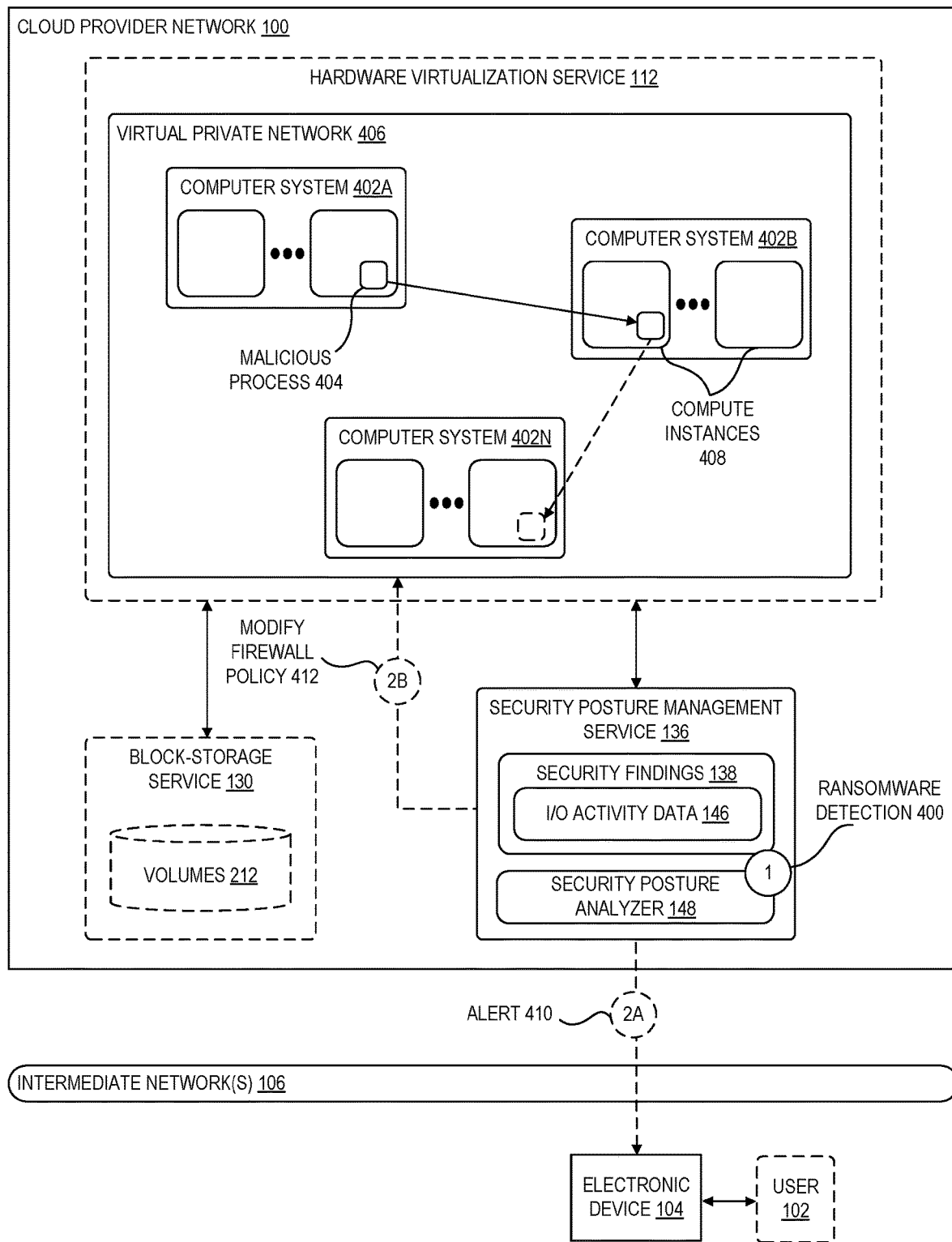
FIG. 4 is a diagram illustrating example remediation actions performed responsive to the detection of a potential ransomware attack or other intentional malicious activity affecting a computer system in a cloud provider network according to some embodiments.

In some embodiments, responsive to a security posture management service 136 or other component determining that a ransomware attack or other malicious activity is likely occurring on a computer system 114, one or more remediation actions can be automatically executed by various components of a cloud provider of which the computer system is a part. FIG. 4 illustrates example remediation actions that can be performed by a cloud provider responsive to detection of I/O activity indicative of a potential attack. For example, at circle "1," ransomware detection 400 (or other type of malicious activity) is performed by a security posture analyzer 148 (or by an I/O proxy device or other component) indicating that a potential ransomware attack is affecting a computer system (e.g., based on a malicious process 404 executing on one or more of computer system 402A, computer system 402B, . . . , computer system 402N, which are part of a user's virtual private network 406). For example, the malicious process 404 is executing on compute instances 408 and, in this example, is attempting to spread or "pivot" to other computer systems in the network.

In some embodiments, responsive to the detection by an I/O proxy device running on a computer system of a potential ransomware attack (e.g., based on monitoring patterns of I/O messages as described above), the I/O proxy device invokes another analyzer on the I/O proxy device. For example, the second I/O proxy device can perform more sophisticated analyses and collect additional log data to be sent to a security posture management 136 for additional analyses. In other examples, an I/O proxy device includes a singular I/O analyzer that performs the analysis, logging, and reporting functionality described herein.

In some embodiments, an I/O proxy device can be automatically configured to throttle or to block subsequent I/O messages responsive to the detection of a potential ransomware attack or other type of intentional malicious activity. For example, once an I/O proxy device detects a pattern of I/O messages indicating that a ransomware attack is underway, the device can begin reducing a rate at which I/O messages are passed from the I/O proxy device to underlying storage volumes in an attempt to impair the ability of a malicious process to modify the contents of a storage volume in undesirable ways, or can pause I/O messages from passing to the underlying storage entirely. The I/O delay can be used to provide additional time, e.g., to conduct additional analyses (e.g., by the security posture management service 136) and to perform various remediation actions.

At circle "2A" in FIG. 4, responsive to the identification of a potential ransomware attack, an I/O proxy device, security posture management service 136, or other component optionally generates an alert 410 for a user associated with the affected computing system. The alert can be provided to enable a user to investigate and perform manual remediation actions, as needed, and can also be provided in combination with the performance of various automatic remediation actions as described herein.

At circle "2B," the security posture management service 136 or other component can modify firewall policy 412 or modify other network settings to help prevent a malicious process executing the ransomware attack from spreading to other computer systems. In some embodiments, data contained in the security findings 138 can provide information about where a ransomware attack may have originated, where a malicious process is trying to spread, and other information can help automate the generation of firewall policy or other security measures to prevent the process from spreading.

In some embodiments, the types of remediation actions performed responsive to detection of a potential ransomware attack can include actions to generate snapshots of a storage volume reflecting a state of a storage volume prior to completion of a ransomware attack (e.g., before a malicious process completes encrypting or otherwise rendering a storage volume or set of files inaccessible), or to otherwise cause one or more snapshots to be retained in storage and to provide access to such snapshots (e.g., access to automatically generated snapshots, the creation of which may precede detection of an attack). The ability to generate or otherwise provide access to such snapshots enables, for example, the recovery of some or all the data that is the target of a ransomware attack or other malicious activity. For example, in some embodiments, a block-storage service 130 enables users to back up the data on storage volumes to another storage location (e.g., a storage bucket managed by a separate object storage service of the cloud provider) by taking point-in-time snapshots. In some examples, a block storage service further enables the creation of incremental backups, where only the blocks on the device that have changed since a most recent snapshot are saved, thereby minimizing the time required to create snapshots and reducing storage. In general, each snapshot contains the information that is needed to restore the data in a storage volume to a new volume. In some embodiments, while the process of creating a point-in-time snapshot is pending (e.g., when all modified blocks are transferred to a separate storage location), the in-progress snapshot is not affected by ongoing reads and writes to the volume.

Figure 5:
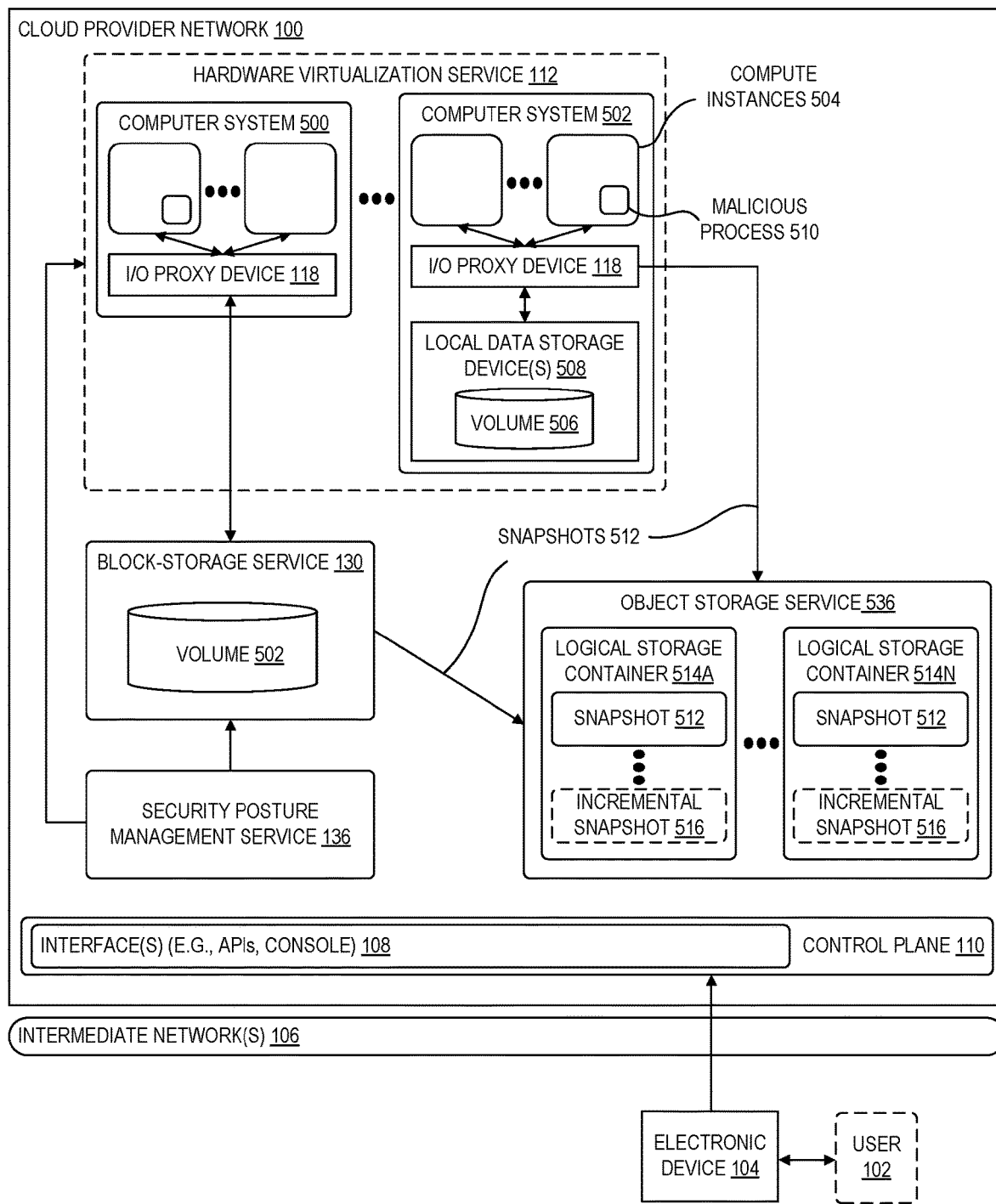
FIG. 5 is a diagram illustrating an environment for providing access to volume snapshots responsive to the detection of a potential ransomware attack or other intentional malicious activity affecting a computer system in a cloud provider network according to some embodiments.

FIG. 5 is a diagram illustrating an environment for enabling the automatic creation of volume snapshots responsive to the detection of a potential ransomware attack affecting a computer system in a cloud provider according to some embodiments. FIG. 5 illustrates a computer system 500 including an I/O proxy device 118 and that hosts compute instances, at least one of which has attached a storage volume 502 provided by block-storage service 130, and a computer system 500 hosting compute instances 504, at least one of which has attached a storage volume 506 provided by a local data storage device 508. In general, the storage volume snapshots to which users can be provided access can include any of: "offboard" snapshots sent from a computer system to which a storage volume is attached to a separate storage service (e.g., an object storage service 536), offboard snapshots sent to some other type of storage resource or stored using the same storage resources from which the snapshots were generated, snapshots that are stored as part of the storage volume itself, and the like.

In the example of FIG. 5, some of the compute instances are infected by a malicious process 510 that is attempting to carry out ransomware attacks on data stored, e.g., in the storage volume 502 or volume 506. In some embodiments, responsive to the detection of a potential ransomware attack or other type of malicious activity by an I/O proxy device 118 or security posture management service 136, the I/O proxy device 118 or block-storage service 130 generates snapshots 512 of the storage volume while the ransomware attacks are occurring (e.g., before the entire contents of the storage volumes are rendered inaccessible by the ransomware attack). For example, a snapshot can be generated of a local volume 506 responsive to the device detecting an anomalous pattern of I/O messages, responsive to a security posture management service 136 confirming a likely ransomware attack, or both. Similarly, an I/O proxy device 118 or security posture management service 136 can send a request to a block-storage service 130 to create a snapshot of a volume 502 provided by the service. These snapshots, for example, can include point-in-time snapshots reflecting a state of the volume at the time the snapshot generation process is initiated.

In some embodiments, the snapshots generated by an I/O proxy device 118 or block-storage service 130 can be stored in logical storage containers (e.g., logical storage container 514A, . . . , logical storage container 514N) provided by an object storage service 536. These logical storage containers can be containers associated with a user account related to the affected computer system(s), such that the user accounts can access the automatically generated snapshots as needed. In some embodiments, an I/O proxy device 118 or block-storage service 130 can also be configured to generate one or more incremental snapshots 516, where the incremental snapshots store only the changes since a previous snapshot. These incremental snapshots can be used, for example, to snapshot changes made to a volume from processes other than a malicious process and including data changes which a user may desire to access.

In some embodiments, a user optionally has automatic snapshots configured for a storage volume (e.g., a volume 502). In this example, an I/O proxy device 118, security posture management service 136, or other component can determine a time at which a potential ransomware attack is suspected to have started affecting a storage volume (e.g., based on an estimated time at which a series of anomalous I/O messages caused by the malicious process began). The security posture management service 136 or affected computer system can identify one or more snapshots created before or during the detected malicious activity and cause a copy of the snapshots to be retained in storage (e.g., cause the snapshots to not be deleted after some period of time at which the snapshots might be deleted in normal operation). A security posture management service 136 or other service can then provide information to a user identifying a snapshot that was automatically generated prior to the time at which the potential ransomware attack is suspected to have started affecting a storage volume, thereby enabling a user to possibly restore a volume to the time before the ransomware infected the volume.

In some embodiments, a security posture management service 136 can assist a user with restoring a volume from a generated snapshot with security measures in place to reduce a likelihood of the ransomware affecting other systems, or more simply implement security measures to prevent malicious activity from affecting other networked computer systems. For example, if a generated snapshot is known to include a malicious process that caused identification of the ransomware attack, a security posture management service 136 or other service can restore the snapshot and attach it to a computer system that has security settings applied and that are configured to isolate the computer system from other systems. As indicated above, in general, a security posture management service 136 or other service can automatically apply a variety of firewall policy settings or other network settings to a virtual private network in which a computer system affected by a malicious process reside.

Figure 6:
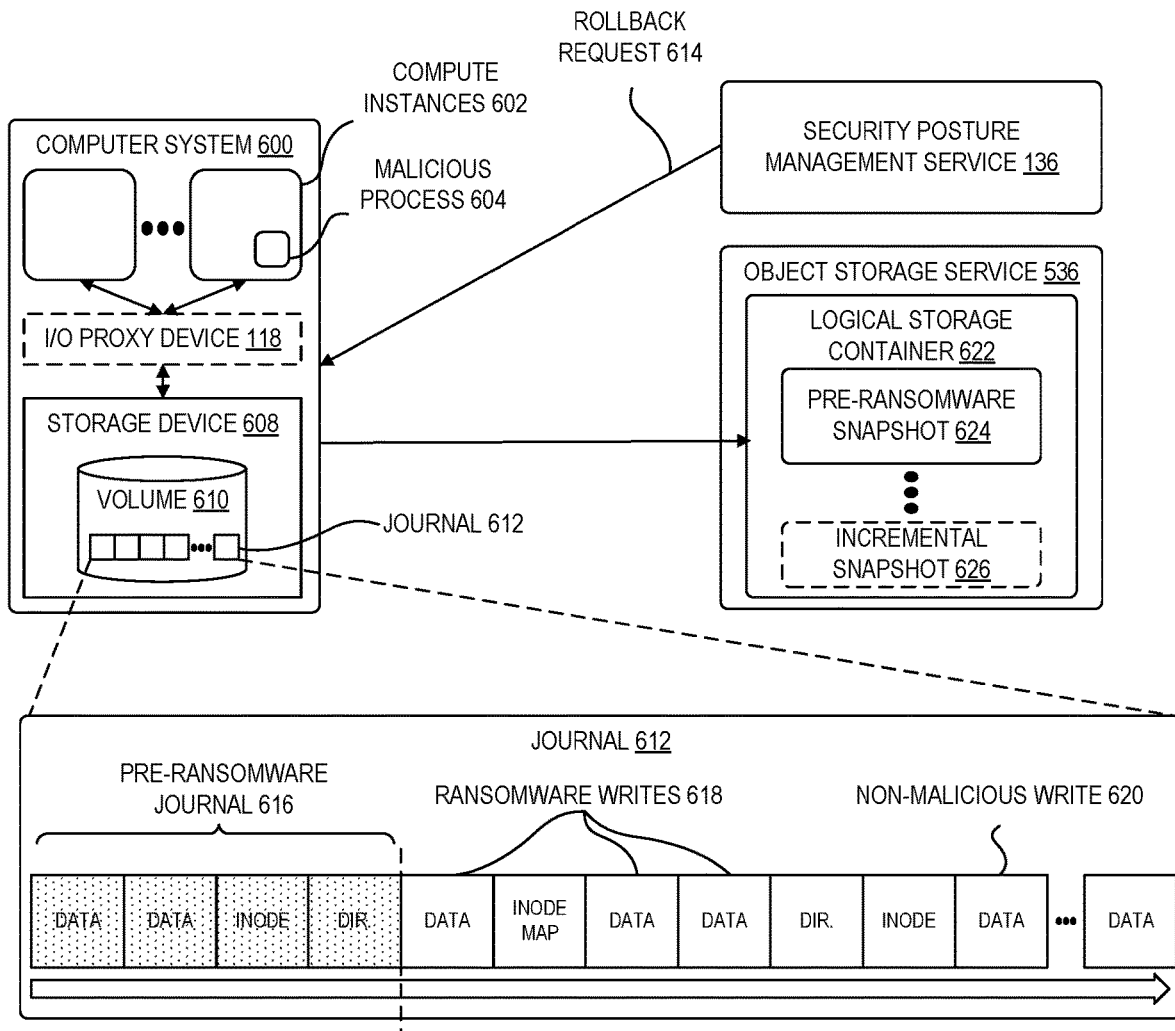
FIG. 6 is a diagram illustrating an environment for enabling the automatic rollback of storage affected by a ransomware attack or other intentional malicious activity using a journal of log-structured storage according to some embodiments.

FIG. 6 is a diagram illustrating an environment for enabling the automatic rollback of a log-structured storage volume responsive to the detection of a potential ransomware attack affecting a computer system according to some embodiments. As shown, a computer system 600 hosts one or more compute instances 602, at least one of which has become infected with a malicious process 604 which may be carrying out a ransomware attack or other type of intentional malicious activity. The computer system 600 further optionally includes an I/O proxy device 606 situated in the I/O path of the computer system 600 between the compute instances 602 and a storage device 608. Although the storage device 608 is illustrated a device that is part of the computer system 600, in other examples, the storage device and associated storage volume 610 can be remote, e.g., provided by a block-storage service of a cloud provider network or otherwise.

In some embodiments, the storage volume 610 is formatted with a log-structured file system comprising a journal 612 and the journal 612 can be used to rollback the file system to points in time prior to when the ransomware was detected. For example, many file systems lay out files and other metadata across a storage volume with a focus on spatial locality and modify the data and metadata in-place. In contrast, a log-structured file system implements its storage as a circular log and writes sequentially to the head of the log. To prevent the circular buffer from overflowing with these sequential writes, garbage collection is periodically performed on the log to release log entries containing a version of data or metadata for which a newer version exists farther ahead in the log.

In FIG. 6, a security posture management service 136 generates a rollback request 614 responsive to the detection of a potential ransomware attack occurring on computer system 600 and affecting the storage volume 610. In some examples, the request can include instructions to the computer system 600 requesting the computer system 600 to pause garbage collection of the journal 612 so that additional history of the journal 612 is not lost. The rollback request 614 can be generated as an automatic request or in response to a user requesting to access previous versions of the associated storage volume 608. For example, the malicious process 604 may be in the process of encrypting the blocks or files of the storage volume 610 in an attempt to render the storage volume contents inaccessible. As indicated above, the security posture management service 136 can detect the presence of the potential ransomware attack based on I/O activity data received from an I/O proxy device 606 of the computer system 600 and further based on correlating the I/O activity data with other security findings obtained by the security posture management service 136 from other sources. In other examples, the rollback/snapshot request 614 is generated locally at the computer system 600, e.g., based on the I/O proxy device 606 detecting the presence of a potential ransomware attack.

In some embodiments, the computer system 600 provides access to the storage volume 610, including an indication of a pointer in the log that precedes an estimated time at which a potential ransomware attack or other malicious activity was believed to be initiated. For example, the journal 612 includes pre-ransomware journal 616 entries (e.g., including log entries reflecting changes to the volume prior to the malicious process 604 performing operations to carry out a ransomware attack), ransomware writes 618 reflecting journal entries caused by write operations initiated by the malicious process, and possibly other non-malicious writes 620 caused by other processes editing data while a ransomware attack is in progress. In this example, the computer system 600 can provide access to the storage volume 610 with a pointer to a journal entry reflecting a point in time before the ransomware writes 618 started (e.g., one of the journal entries including pre-ransomware journal 616). In this manner, the same computer system 600 or another computer system 600 can access the volume with the provided pointer in the log, which reflects at a point prior to when the ransomware attack began, thereby enabling the recovery of data before it is modified by the malicious process. In some embodiments, a security posture management service 136 or other service can also enable the incremental restoration of a volume using incremental log pointers reflecting the log at various points in time in the journal 612 to enable users to potentially recover data that was written after a ransomware attack started by other non-malicious processes. In some embodiments, users can also provide input requesting to attach the journal 612 at other points in time, for example, if a user desires to return the storage volume to a state farther back in the journal (e.g., to a point before a malicious process was even introduced to the system).

In some embodiments, users can request to attach the storage volume to a same or different computer system based on a point in time reflecting a state of the storage volume prior to the initiation of a potential ransomware attack or other malicious activity. For example, a user can request to attach a storage volume 610 with a pointer in the journal 612 reflecting entries only up to a point in time before malicious activity began, e.g., a point somewhere in the pre-ransomware journal 616 in the example of FIG. 6. Responsive to such requests, the storage volume 610 can be attached to the computer system based on a pointer in the log corresponding to the requested point in time, e.g., such that the state of the file system is not yet affected by the intentional malicious activity and data can be potentially saved.

Figure 7:
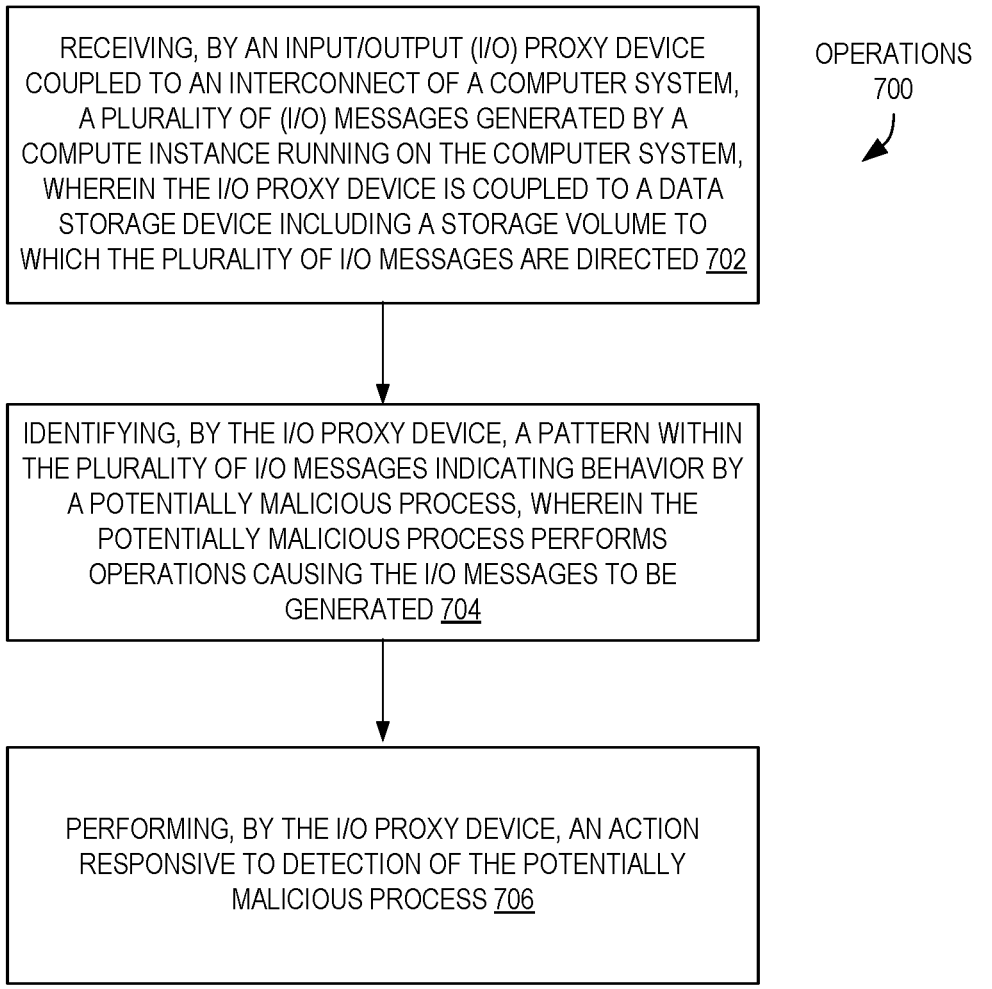
FIG. 7 is a flow diagram illustrating operations of a method for detecting ransomware attacks or other intentional malicious activity by analyzing I/O patterns using I/O proxy devices interconnecting the hardware processing elements of computer systems in a cloud provider network with data storage devices used by the computer systems according to some embodiments.

FIG. 7 is a flow diagram illustrating operations 700 of a method for detecting ransomware attacks or other intentional malicious activity by analyzing I/O patterns using I/O proxy devices interconnecting the hardware processing elements of computer systems in a cloud provider network with data storage devices used by the computer systems according to some embodiments. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 700 are performed by a computer system or other service of a provider network 100 illustrated in the figures.

The operations 700 include, at block 702, receiving, by an input/output (I/O) proxy device coupled to an interconnect of a computer system, a plurality of I/O messages generated by a compute instance running on the computer system, wherein the I/O proxy device is coupled to a data storage device storing a storage volume to which the plurality of I/O messages are directed.

The operations 700 further include, at block 704, identifying, by the I/O proxy device, a pattern within the plurality of I/O messages indicating behavior by a potentially malicious process, wherein the potentially malicious process performs operations causing the I/O messages to be generated.

The operations 700 further include, at block 706, performing, by the I/O proxy device, an action responsive to detection of the potentially malicious process.

In some embodiments, the potentially malicious process is performing a ransomware attack, and wherein the pattern includes a repeating set of operations to read a block of the storage volume, modify the block of the storage volume, and write the modified block to the storage volume.

In some embodiments, the operations further include obtaining, by the security posture management service, security findings related to the computer system, wherein the security findings include data derived from at least one: network flow logs, Domain Name System (DNS) logs, or account activity logs; and determining a likelihood of the potentially malicious process being part of an actual attack based on the data received from the I/O proxy device and at least a portion of the security findings.

In some embodiments, the storage device is part of the computer system, and wherein the plurality of I/O messages include operations performed relative to blocks of the storage volume.

In some embodiments, the storage volume is managed by a block-storage service of a cloud provider and is accessed by the computer system over a network.

In some embodiments, the action includes generating an alert notifying a user associated with the computer system of the potentially malicious process.

In some embodiments, the computer system is coupled to a control plane of a cloud provider, and wherein the method further comprises receiving, by the computer system, a request to enable detection of potentially malicious activity.

In some embodiments, the action includes sending, to a security posture management service of a cloud provider, data indicating detection of the potentially malicious process, wherein the data indicating detection of the potentially malicious process is sent while the potentially malicious process is performing an attack.

In some embodiments, the operations further include causing the computer system to throttle or to block I/O operations responsive to detection of the potentially malicious process.

In some embodiments, the operations further include sending, to a security posture management service of a cloud provider, data indicating detection of the potentially malicious process; determining, based on the data indicating detection of the potentially malicious process, a first likelihood that an actual attack is occurring, wherein the first likelihood is below a threshold likelihood used to determine when to generate an alert; determining, based on the data indicating detection of the potentially malicious process and security findings related to the computer system, a second likelihood that an actual attack is occurring, wherein the second likelihood is above the threshold likelihood used to determine when to generate an alert; and generating the alert.

In some embodiments, the action includes generating a snapshot of the storage volume.

FIG. 8 is a flow diagram illustrating operations 800 of a method for automatically providing access to volume snapshots responsive to the detection of a potential ransomware attack or other intentional malicious activity affecting a computer system in a cloud provider network according to some embodiments. Some or all of the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 800 are performed by a computer system or other service of a provider network 100 illustrated in the figures.

The operations 800 include, at block 802, detecting, by a computer system, a pattern of input/output (I/O) messages indicative of a potential ransomware attack, wherein the potential ransomware attack affects a storage volume attached to a compute instance running on the computer system, and wherein the potential ransomware attack involves a malicious process running on the compute instance.

The operations 800 further include, at block 804, identifying a snapshot of the storage volume.

The operations 800 further include, at block 806, causing a copy of the snapshot of the storage volume to be retained in storage.

In some embodiments, the operations further include causing an input/output (I/O) proxy device coupled to the computer system to throttle or to block I/O operations responsive to detection of the potential ransomware attack.

In some embodiments, the operations further include modifying one or more network security rules associated with a virtual private network containing the computer system.

In some embodiments, the storage volume resides on a storage device that is part of the computer system, and creating the snapshot of the storage volume includes the computer system sending the snapshot to a logical storage container of an object storage service provided by a cloud provider In some embodiments, the storage volume is managed by a block-storage service of a cloud provider and is accessed by the computer system over a network, and wherein creating the snapshot of the storage volume includes sending a request to the block-storage service to create the snapshot of the storage volume.

In some embodiments, the operations further include generating an alert notifying a user associated with the computer system of the potential ransomware attack, wherein the alert includes identification of a storage location of the snapshot.

In some embodiments, the computer system is coupled to a control plane of a cloud provider, and wherein the method further comprises receiving, by the computer system, a request to enable detection of potential ransomware attacks.

In some embodiments, the operations further include creating an incremental snapshot of the storage volume, wherein the incremental snapshot reflects changes to the storage volume relative to the snapshot, wherein the incremental snapshot is created while the malicious process is performing the potential ransomware attack; and providing access to the incremental snapshot of the storage volume.

In some embodiments, the operations further include sending, to a security posture management service of a cloud provider, data indicating detection of the potential ransomware attack.

In some embodiments, the operations further include sending, to a security posture management service of a cloud provider, data indicating detection of the potential ransomware attack; determining, based on the data indicating detection of the potential ransomware attack, a first likelihood that an actual ransomware attack is occurring, wherein the first likelihood is below a threshold likelihood used to determine when to generate an alert; determining, based on the data indicating detection of the potential ransomware attack and security findings related to the computer system, a second likelihood that an actual ransomware attack is occurring, wherein the second likelihood is above the threshold likelihood used to determine when to generate an alert, and wherein the security findings include data derived from at least one of: network flow logs, Domain Name System (DNS) logs, or account activity logs; and generating the alert.

In some embodiments, the I/O messages are monitored by an input/output (I/O) proxy device coupled to an interconnect of a computer system, and wherein the I/O proxy device is coupled to a data storage device including a storage volume to which the I/O messages are directed.

Figure 9:
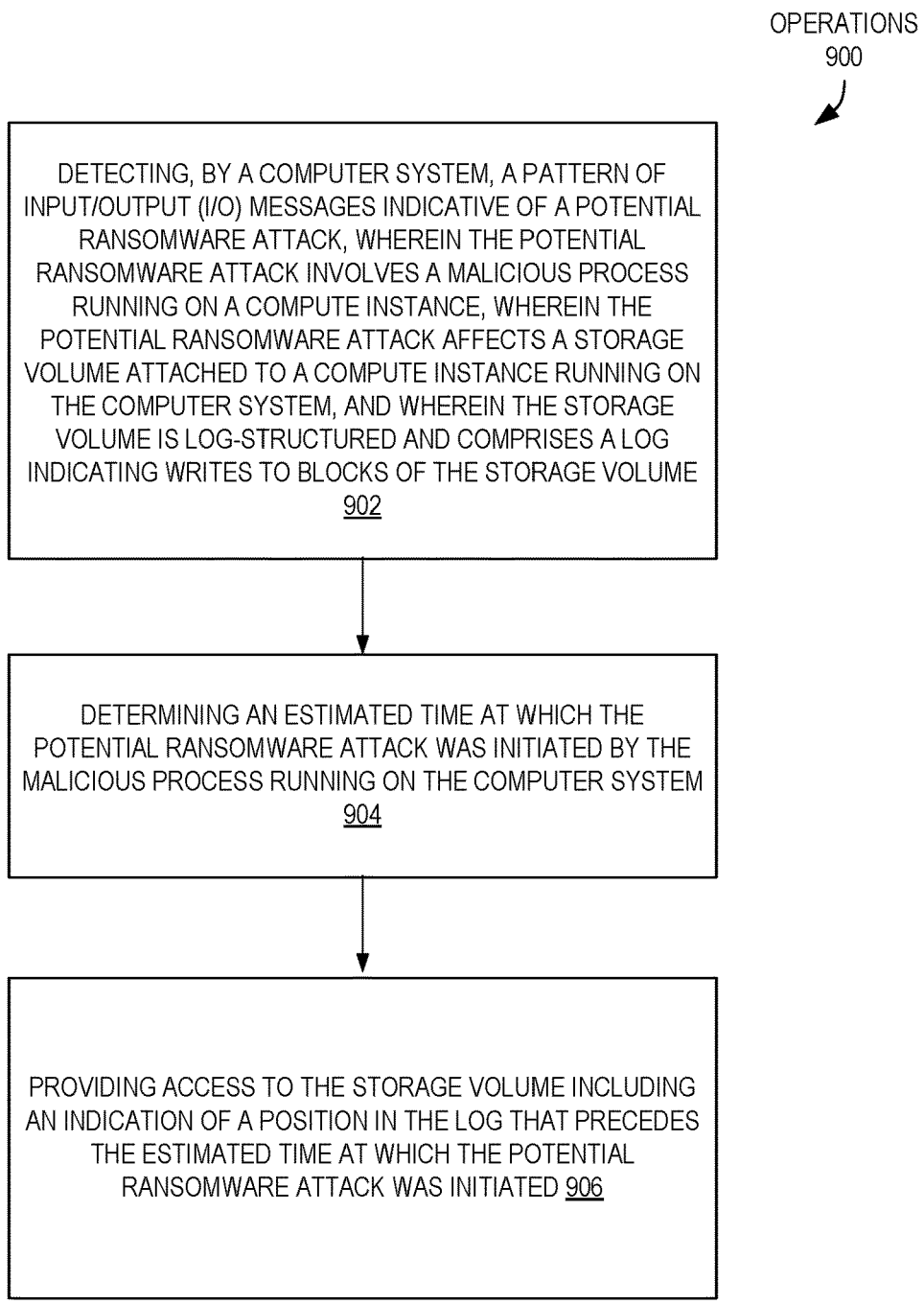
FIG. 9 is a flow diagram illustrating operations of a method for enabling the rollback of log-structured storage or otherwise providing access to earlier states of a storage volume using a log-structured journal responsive to the detection of a potential ransomware attack or other intentional malicious activity affecting a computer system according to some embodiments.

FIG. 9 is a flow diagram illustrating operations 900 of a method for initiating the automatic rollback of log-structured storage or otherwise providing access to earlier states of a storage volume using a log-structured journal responsive to the detection of a potential ransomware attack or other intentional malicious activity affecting a computer system according to some embodiments. Some or all of the operations 900 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 900 are performed by a computer system or other service of a provider network 100 illustrated in the figures.

The operations 900 include, at block 902, detecting, by a computer system, a pattern of input/output (I/O) messages indicative of a potential ransomware attack, wherein the potential ransomware attack involves a malicious process running on a compute instance, wherein the potential ransomware attack affects a storage volume attached to a compute instance running on the computer system, and wherein the storage volume is log-structured and comprises a log indicating writes to blocks of the storage volume.

The operations 900 further include, at block 904, determining an estimated time at which the potential ransomware attack was initiated by the malicious process running on the computer system.

The operations 900 further include, at block 906, providing access to the storage volume including an indication of a position in the log that precedes the estimated time at which the potential ransomware attack was initiated.

In some embodiments, the computer system is a first computer system, and the operations further include: receiving a request to attach the storage volume to a second computer system, wherein the request indicates a point in time reflecting a state of the storage volume prior to initiation of the potential ransomware attack; and attaching the storage volume to the second computer system based on a position in the log corresponding to the point in time.

In some embodiments, the operations further include modifying one or more network security rules associated with a virtual private network containing the computer system.

In some embodiments, the storage volume resides on a storage device that is part of the computer system, and wherein the I/O messages include operations performed relative to blocks of the storage volume.

In some embodiments, the storage volume is managed by a block-storage service of a cloud provider and is accessed by the computer system over a network.

In some embodiments, the operations further include generating an alert notifying a user associated with the computer system of the potential ransomware attack, wherein the alert includes identification of the storage volume.

In some embodiments, the computer system is coupled to a control plane of a cloud provider, and the operations further include receiving, by the computer system, a request to enable detection of potential ransomware attacks.

In some embodiments, the operations further include sending, to a security posture management service of a cloud provider, data indicating detection of the potential ransomware attack, wherein the data indicating detection of the potential ransomware attack is sent while the malicious process is performing the ransomware attack.

In some embodiments, the operations further include causing an input/output (I/O) proxy device coupled to the computer system to throttle or to block I/O operations responsive to detection of the potential ransomware attack.

In some embodiments, the operations further include sending, to a security posture management service of a cloud provider, data indicating detection of the potential ransomware attack; determining, based on the data indicating detection of the potential ransomware attack, a first likelihood that an actual ransomware attack is occurring, wherein the first likelihood is below a threshold likelihood used to determine when to generate an alert; determining, based on the data indicating detection of the potential ransomware attack and security findings related to the computer system, a second likelihood that an actual ransomware attack is occurring, wherein the second likelihood is above the threshold used to determine when to generate the alert; and sending the alert.

In some embodiments, the I/O messages are monitored by an input/output (I/O) proxy device coupled to an interconnect of a computer system, and wherein the I/O proxy device is coupled to a data storage device including a storage volume to which the I/O messages are directed.

Figure 10:
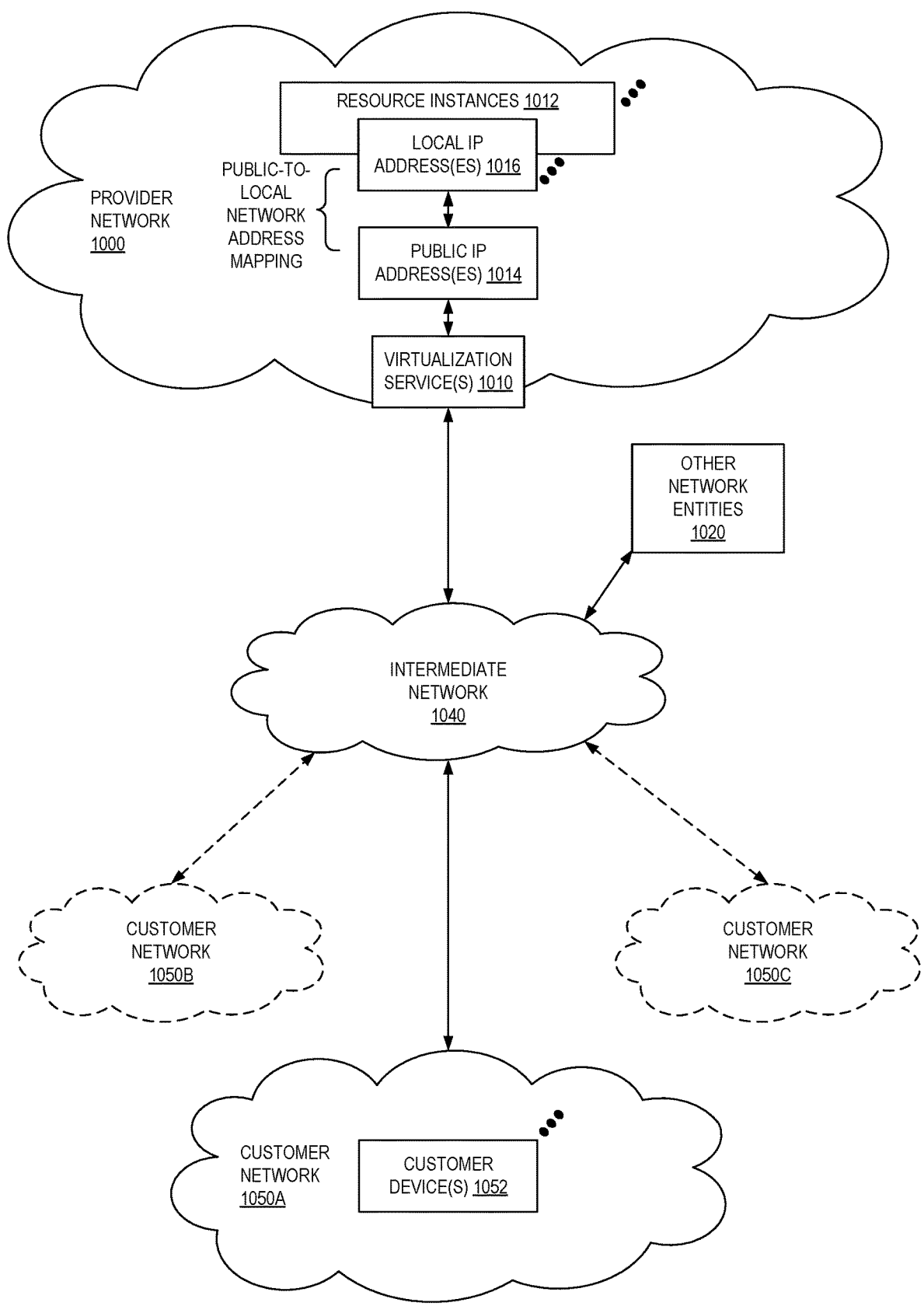
FIG. 10 illustrates an example provider network environment according to some embodiments.

FIG. 10 illustrates an example provider network (or "service provider system") environment according to some embodiments. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some embodiments, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
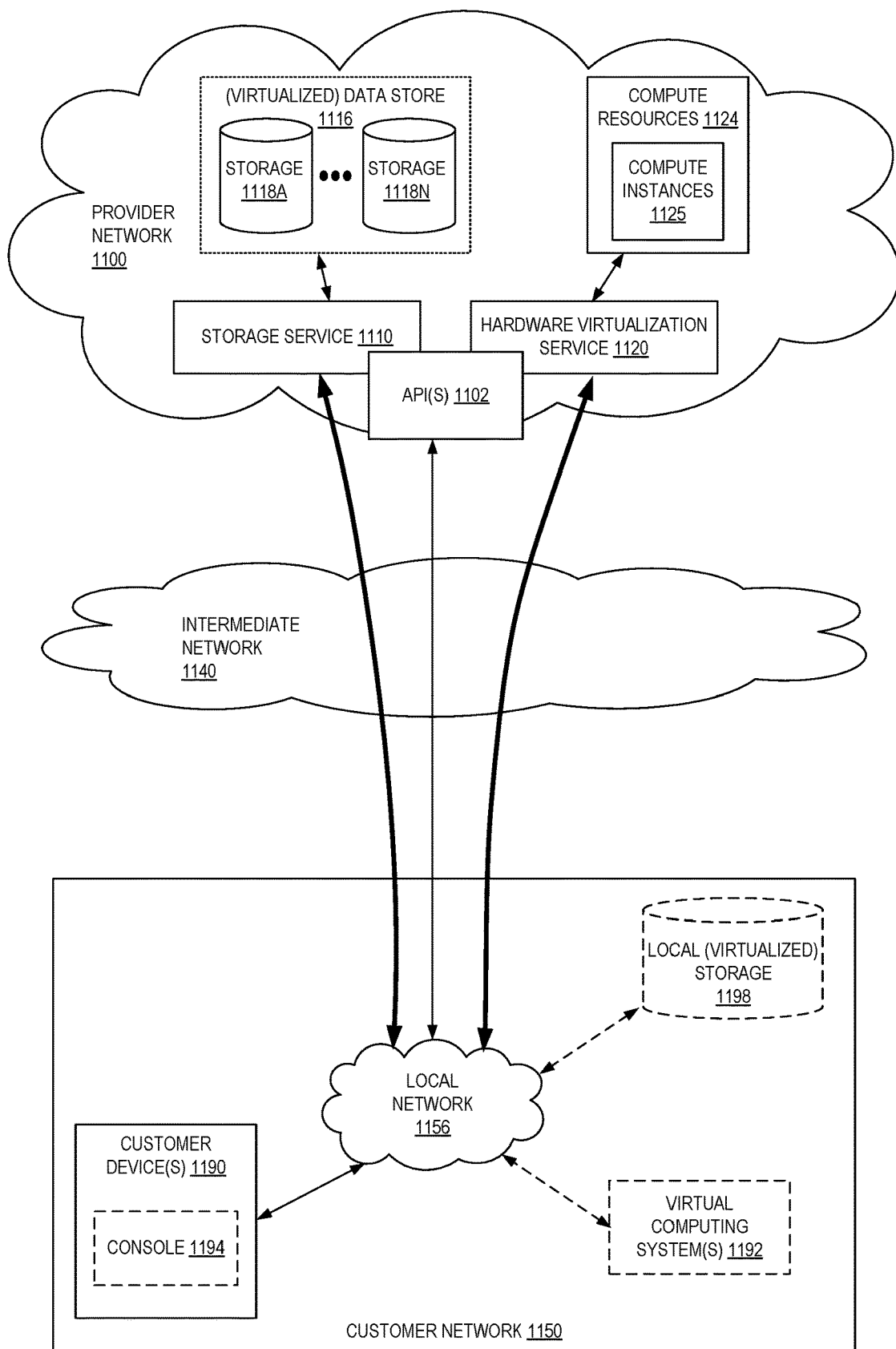
FIG. 11 is a block diagram of an example provider network that provides a storage service and a hardware virtualization service to customers according to some embodiments.

FIG. 11 is a block diagram of an example provider network environment that provides a storage service and a hardware virtualization service to customers, according to some embodiments. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some embodiments, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some embodiments, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some embodiments, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some embodiments, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Figure 12:
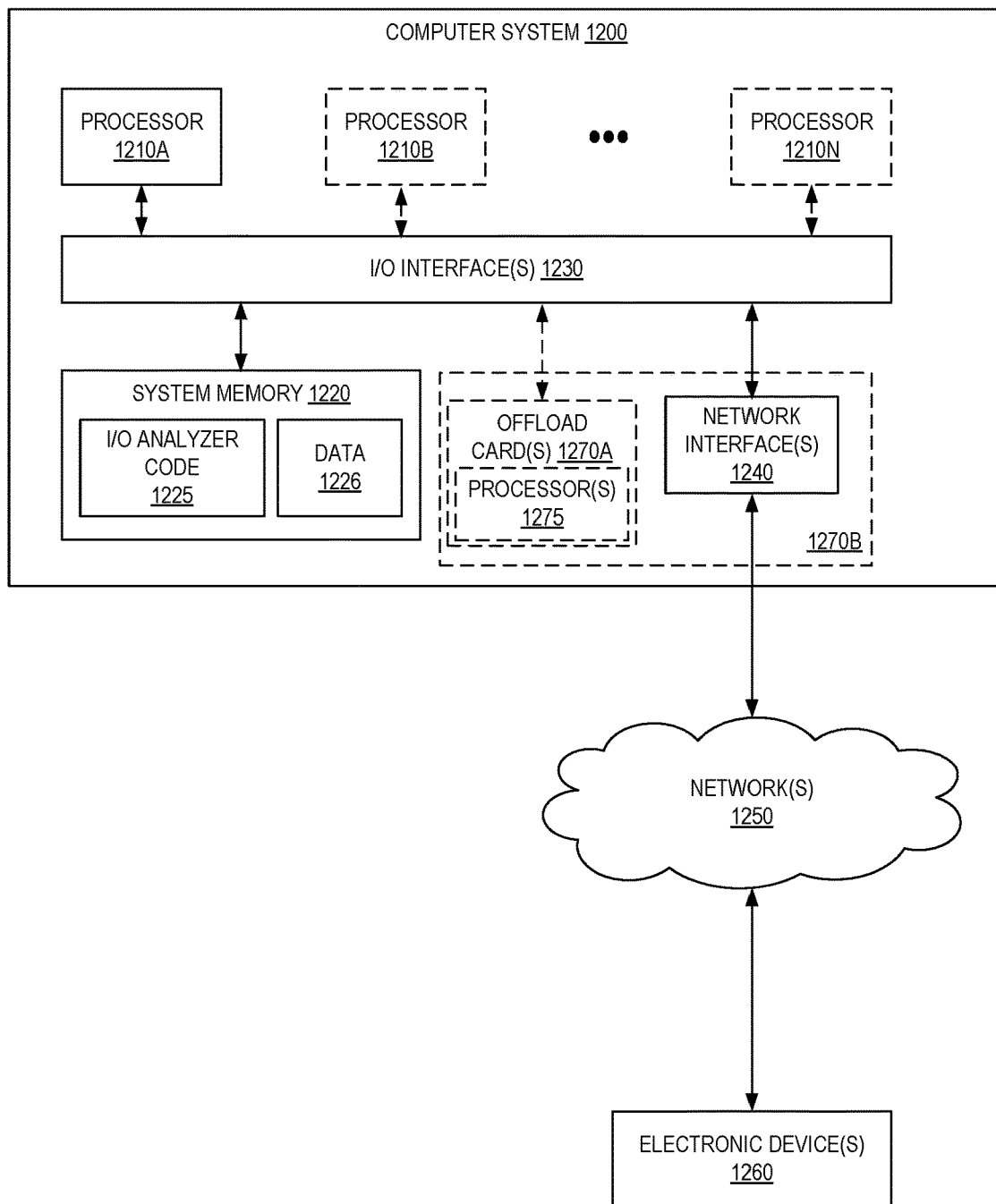
FIG. 12 is a block diagram illustrating an example computer system that can be used in some embodiments.

In some embodiments, a system that implements a portion or all of the techniques described herein can include a general-purpose computer system, such as the computer system 1200 illustrated in FIG. 12, that includes, or is configured to access, one or more computer-accessible media. In the illustrated embodiment, the computer system 1200 includes one or more processors 1210 coupled to a system memory 1220 via an input/output (I/O) interface 1230. The computer system 1200 further includes a network interface 1240 coupled to the I/O interface 1230. While FIG. 12 shows the computer system 1200 as a single computing device, in various embodiments the computer system 1200 can include one computing device or any number of computing devices configured to work together as a single computer system 1200.

In various embodiments, the computer system 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various embodiments, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various embodiments, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1220 as I/O analyzer code 1225 (e.g., executable to implement, in whole or in part, the I/O analyzer 122 or security posture analyzer 148) and data 1226.

In some embodiments, the I/O interface 1230 can be configured to coordinate I/O traffic between the processor 1210, the system memory 1220, and any peripheral devices in the device, including the network interface 1240 and/or other peripheral interfaces (not shown). In some embodiments, the I/O interface 1230 can perform any necessary protocol, timing, or other data transformations to convert data signals from one component (e.g., the system memory 1220) into a format suitable for use by another component (e.g., the processor 1210). In some embodiments, the I/O interface 1230 can include support for devices attached through various types of peripheral buses, such as a variant of the Peripheral Component Interconnect (PCI) bus standard or the Universal Serial Bus (USB) standard, for example. In some embodiments, the function of the I/O interface 1230 can be split into two or more separate components, such as a north bridge and a south bridge, for example. Also, in some embodiments, some or all of the functionality of the I/O interface 1230, such as an interface to the system memory 1220, can be incorporated directly into the processor 1210.

The network interface 1240 can be configured to allow data to be exchanged between the computer system 1200 and other devices 1260 attached to a network or networks 1250, such as other computer systems or devices as illustrated in FIG. 1, for example. In various embodiments, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some embodiments the offload card(s) 1270A or 1270B can perform compute instance management operations, such as pausing and/or un-pausing compute instances, launching and/or terminating compute instances, performing memory transfer/copying operations, etc. These management operations can, in some embodiments, be performed by the offload card(s) 1270A or 1270B in coordination with a hypervisor (e.g., upon a request from a hypervisor) that is executed by the other processors 1210A-1210N of the computer system 1200. However, in some embodiments the virtualization manager implemented by the offload card(s) 1270A or 1270B can accommodate requests from other entities (e.g., from compute instances themselves), and cannot coordinate with (or service) any separate hypervisor.

In some embodiments, the system memory 1220 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
receiving, by an input/output (I/O) proxy device of a computer system coupled to an interconnect of the computer system, a plurality of I/O messages caused by a process running on a guest operating system or a container running on the computer system, wherein the I/O proxy device is coupled to a data storage device storing a storage volume to which the plurality of I/O messages are directed, and wherein the I/O proxy device is further coupled to a control plane of a cloud provider;
identifying, by the I/O proxy device, a pattern within the plurality of I/O messages indicating a ransomware attack;
sending, to a security posture management service of the cloud provider, data indicating detection of the ransomware attack, wherein the data indicating detection of the ransomware attack is sent while the process is performing the ransomware attack;
wherein the storage volume is formatted with a log-structured file system comprising a journal;
wherein the journal, prior to the plurality of I/O messages being caused by the process, comprises pre-ransomware journal entries; and wherein the journal, after the plurality of I/O messages are caused by the process, comprises ransomware writes that follow the pre-ransomware journal entries in the journal.

2. The computer-implemented method of claim 1, wherein identifying the pattern includes identifying, by the I/O proxy device and within the plurality of I/O messages, a repeating set of operations to read a block of the storage volume, modify the block of the storage volume, and write the modified block to the storage volume.

3. The computer-implemented method of claim 1, further comprising:
obtaining, by the security posture management service, security findings related to the computer system, wherein the security findings include data derived from at least one: network flow logs, Domain Name System (DNS) logs, or account activity logs.

4. A computer-implemented method comprising:
receiving, by an input/output (I/O) proxy device coupled to an interconnect of a computer system, a plurality of I/O messages caused by a process running on a guest operating system or a container running on the computer system, wherein the I/O proxy device is coupled to a data storage device storing a storage volume to which the plurality of I/O messages are directed;
identifying, by the I/O proxy device, a pattern within the plurality of I/O messages indicating that the process is malicious; and
performing, by the I/O proxy device, an action responsive to identifying the pattern indicating that the process is malicious.

5. The computer-implemented method of claim 4, wherein identifying the pattern includes identifying, by the I/O proxy device and within the plurality of I/O messages, a repeating set of operations to read a block of the storage volume, modify the block of the storage volume, and write the modified block to the storage volume.

6. The computer-implemented method of claim 4, further comprising:
obtaining, by a security posture management service, security findings related to the computer system, wherein the security findings include data derived from at least one: network flow logs, Domain Name System (DNS) logs, or account activity logs.

7. The computer-implemented method of claim 4, wherein the storage device is part of the computer system, and wherein the plurality of I/O messages indicate operations performed relative to blocks of the storage volume.

8. The computer-implemented method of claim 4, wherein the storage volume is managed by a block-storage service of a cloud provider and is accessed by the computer system over a network.

9. The computer-implemented method of claim 4, wherein the action includes generating an alert notifying a user associated with the computer system that the process is malicious.

10. The computer-implemented method of claim 4, wherein the computer system is coupled to a control plane of a cloud provider, and wherein the method further comprises receiving, by the computer system, a request to enable detection of malicious activity.

11. The computer-implemented method of claim 4, wherein the action performed responsive to identifying the pattern indicating that the process is malicious comprises sending, to a security posture management service of a cloud provider, data indicating that the process is malicious, wherein the data indicating that the process is malicious is sent to the security posture management service while the process is performing a ransomware attack.

12. The computer-implemented method of claim 4, wherein the action performed responsive to identifying the pattern indicating that the process is malicious comprises causing the computer system to throttle or to block I/O operations.

13. The computer-implemented method of claim 4, further comprising:
sending, to a security posture management service of a cloud provider, data indicating that the process is malicious.

14. The computer-implemented method of claim 4, wherein the action performed responsive to identifying the pattern indicating that the process is malicious comprises generating a snapshot of the storage volume.

15. A system comprising:
a first one or more electronic devices to implement a computer system in a cloud provider, wherein the computer system includes instructions that upon execution cause the computer system to:
receive, by an input/output (I/O) proxy device of the computer system coupled to an interconnect of the computer system, a plurality of I/O messages caused by a compute instance running on a guest operating system or a container of the computer system, wherein the I/O proxy device is coupled to a data storage device storing a storage volume to which the plurality of I/O messages are directed;
identify, by the I/O proxy device, a pattern within the plurality of I/O messages indicating malicious behavior by the compute instance; and
perform, by the I/O proxy device, an action responsive to detection of the pattern; and
a second one or more electronic devices to implement a security posture management service in the cloud provider, wherein the security posture management service includes instructions that upon execution cause the security posture management service to:
receive data indicating detection of the pattern, and
obtain security findings related to the computer system.

16. The system of claim 15, wherein the compute instance is performing a ransomware attack, and wherein the computer system includes instructions that upon execution cause the computer system to identify, by the I/O proxy, the pattern based on identifying, by the I/O proxy device and within the plurality of I/O operations, a repeating set of operations to read a block of the storage volume, modify the block of the storage volume, and write the modified block to the storage volume.

17. The system of claim 15, wherein the storage volume resides on a storage device that is part of the computer system, and wherein the plurality of I/O messages indicate operations performed on blocks of the storage volume.

18. The system of claim 15, wherein the storage volume is managed by a block-storage service of a cloud provider and is accessed by the computer system over a network.

19. The system of claim 15, wherein the action includes generating an alert notifying a user associated with the computer system affected by the malicious process.

20. The system of claim 15, wherein the computer system is coupled to a control plane of a cloud provider, and wherein the instructions upon execution further cause the computer system to receive a request to enable detection of malicious processes.

* * * * *